(12) United States Patent
Nguyen et al.

(10) Patent No.: US 11,719,884 B2
(45) Date of Patent: Aug. 8, 2023

(54) OPTICAL FIBER ALIGNMENT TOOL AND METHOD OF SETTING OPTICAL FIBERS IN FIBER HOLDER

(71) Applicant: FUJIKURA LTD., Tokyo (JP)

(72) Inventors: Thao Thi Thanh Nguyen, Chiba (JP); Junya Watanabe, Chiba (JP); Kunihiko Fujiwara, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 17/424,022

(22) PCT Filed: Jan. 30, 2020

(86) PCT No.: PCT/JP2020/003365
§ 371 (c)(1),
(2) Date: Jul. 19, 2021

(87) PCT Pub. No.: WO2020/158848
PCT Pub. Date: Aug. 6, 2020

(65) Prior Publication Data
US 2022/0082758 A1  Mar. 17, 2022

(30) Foreign Application Priority Data

Jan. 30, 2019 (JP) ............................... 2019-014608
Aug. 28, 2019 (JP) ............................... 2019-155923
Aug. 28, 2019 (JP) ............................... 2019-155935

(51) Int. Cl.
*G02B 6/255* (2006.01)

(52) U.S. Cl.
CPC ................ *G02B 6/2555* (2013.01)

(58) Field of Classification Search
CPC ................................................... G02B 6/2555
See application file for complete search history.

(56) References Cited

U.S. PATENT DOCUMENTS 4,830,646 A  5/1989  Rossberg
2014/0072265 A1  3/2014  Ott

FOREIGN PATENT DOCUMENTS

| JP | H04-139407 A | 5/1992 |
| JP | H05-027143 A | 2/1993 |
| JP | H08-122558 A | 5/1996 |
| JP | 2006-350210 A | 12/2006 |
| JP | 2007-316474 A | 12/2007 |
| JP | 2008-225006 A | 9/2008 |
| JP | 2011-013635 A | 1/2011 |
| JP | 2011-95411 A | 5/2011 |
| JP | 5290390 B2 | 9/2013 |
| JP | 2015-508188 A | 3/2015 |
| WO | 2014/060883 A1 | 4/2014 |

*Primary Examiner* — Omar R Rojas
(74) *Attorney, Agent, or Firm* — Osha Bergman Watanabe & Burton LLP

(57) ABSTRACT

An optical fiber alignment tool includes a fiber aligner that includes: separators that assort optical fibers; and fiber insertion portions each disposed between a respective pair of the separators and that align the optical fibers in an alignment direction in a predetermined order when the optical fibers are inserted into the fiber insertion portion; and a fiber holding portion that includes a mount surface on which the optical fibers are mounted. The fiber aligner and the fiber holding portion are relatively movable in the alignment direction of the optical fibers.

9 Claims, 18 Drawing Sheets

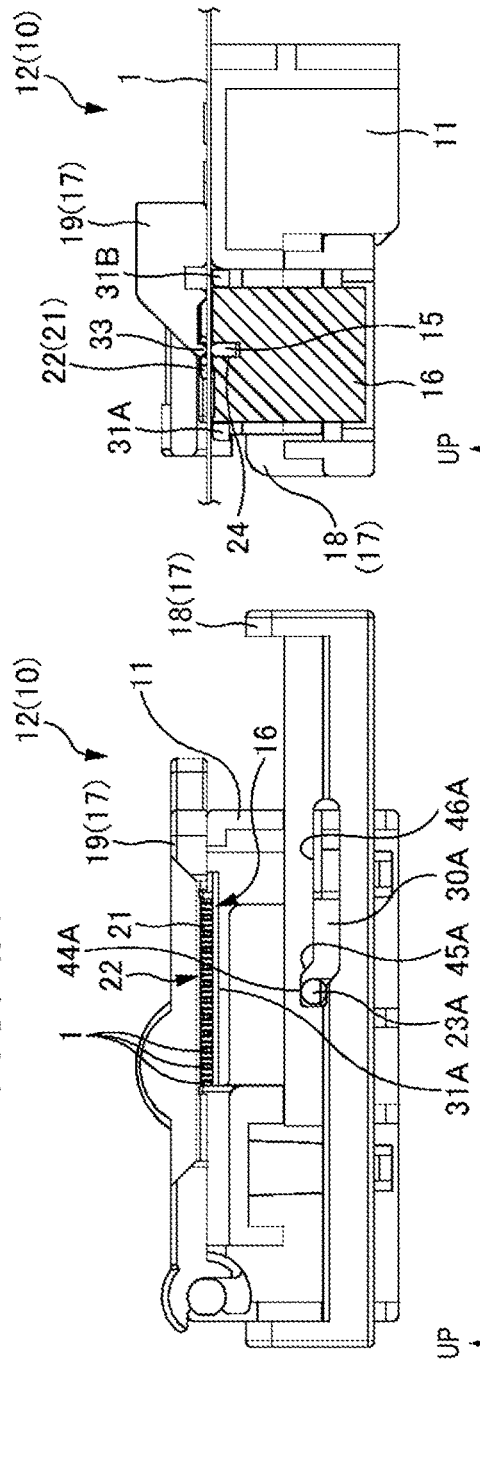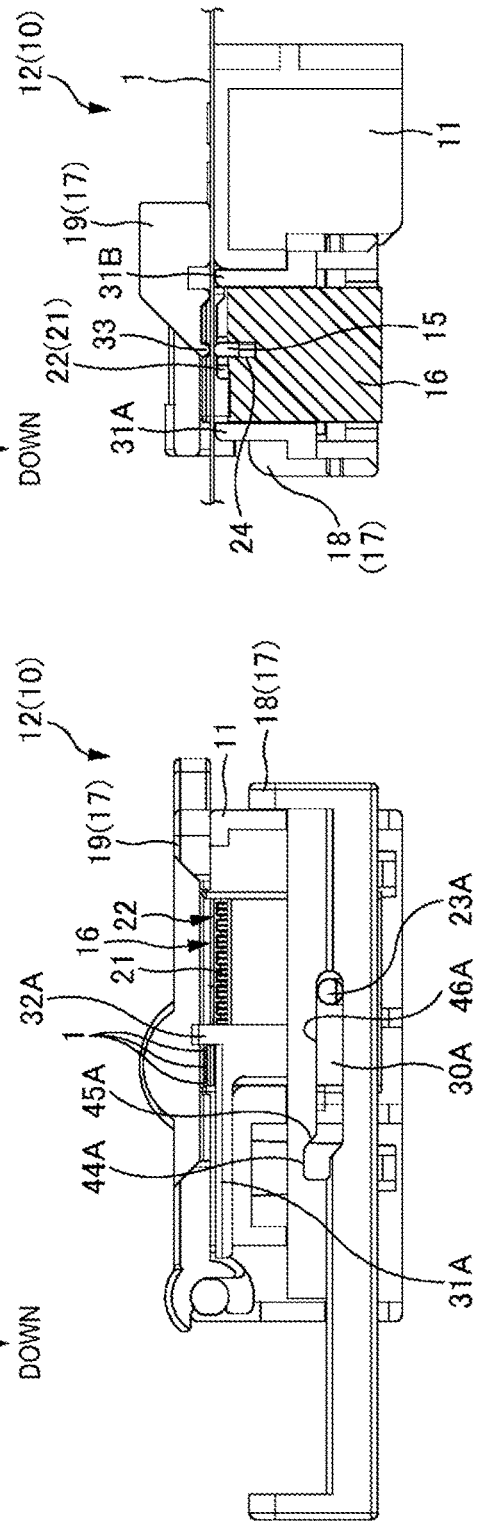

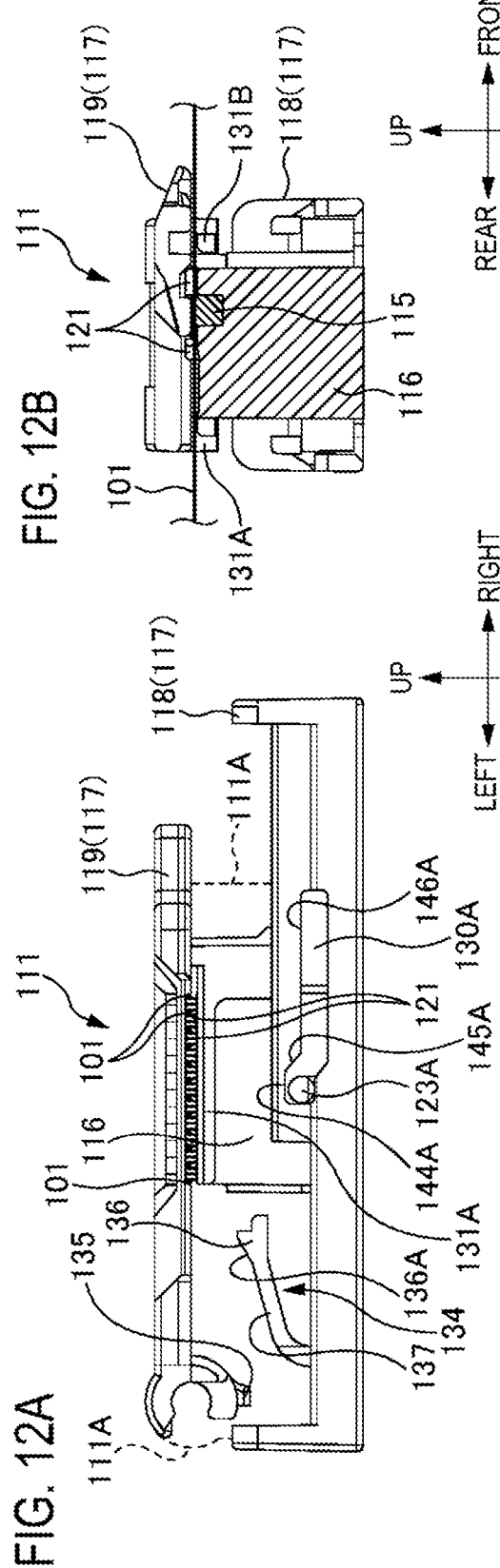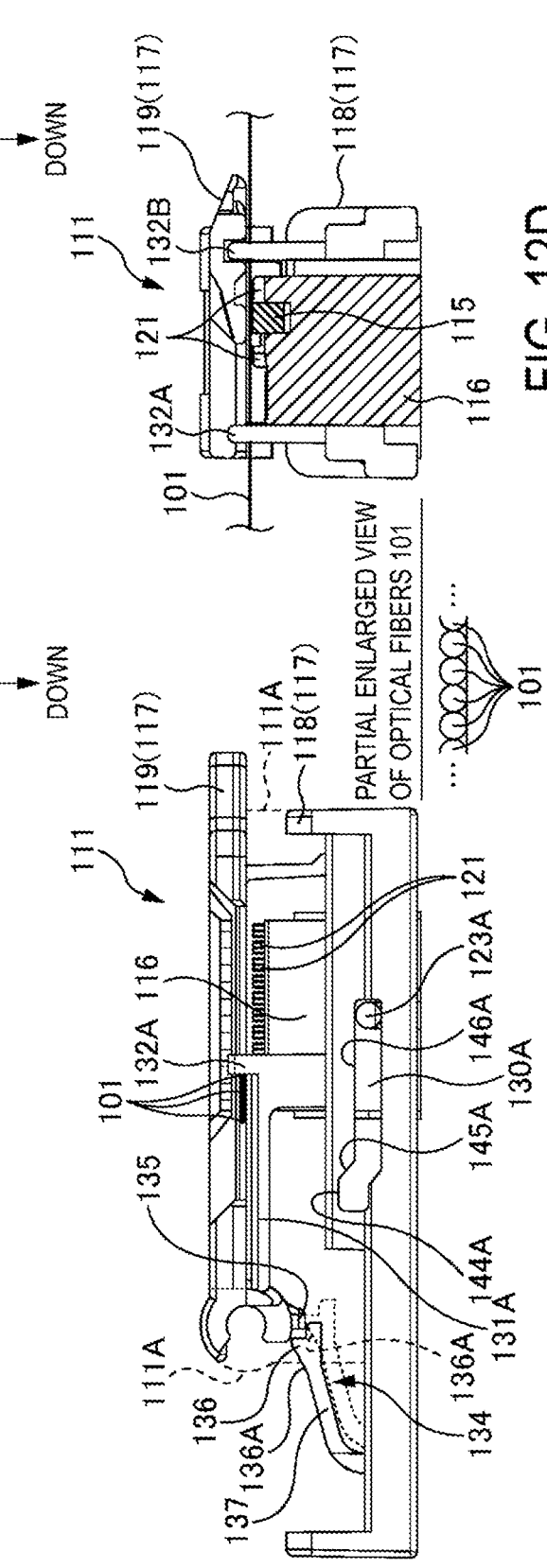

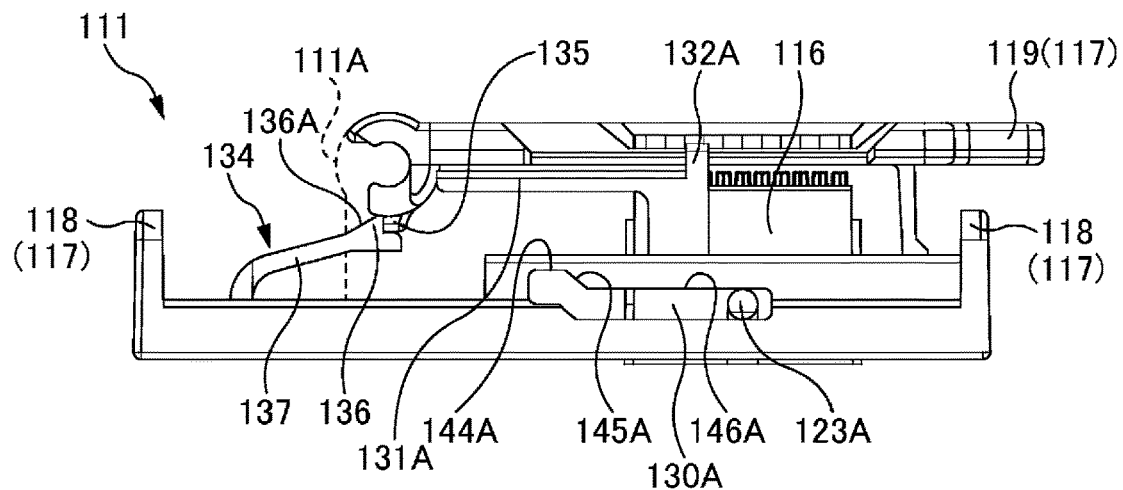
FIG. 14A
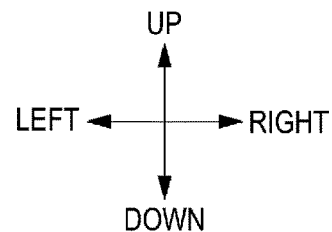
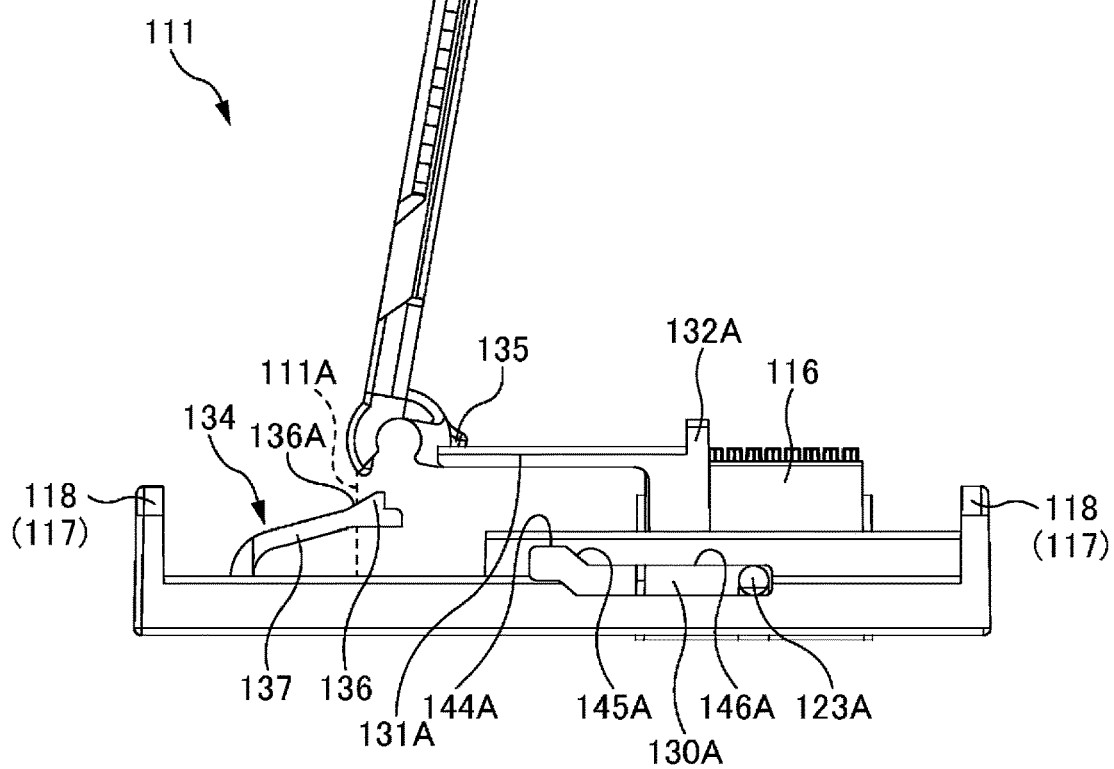
FIG. 14B

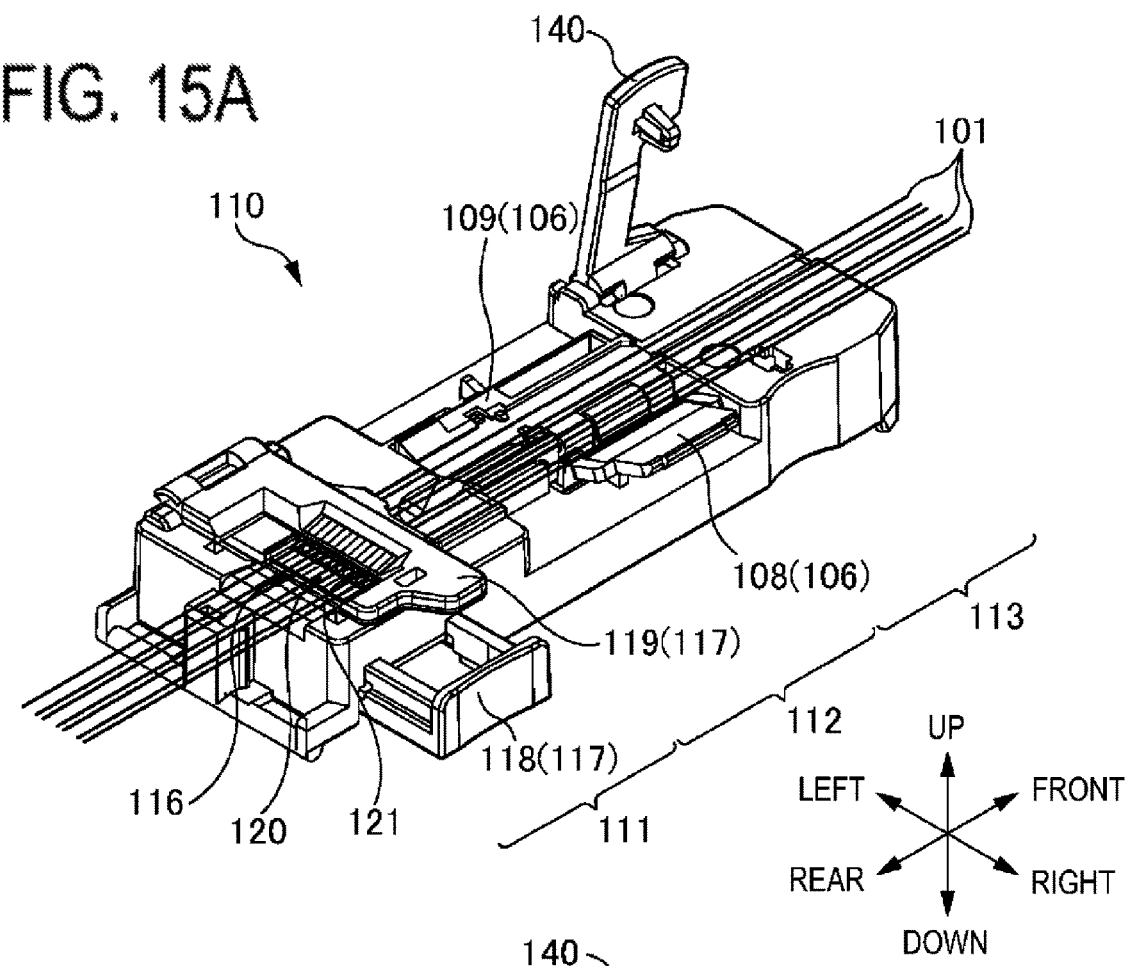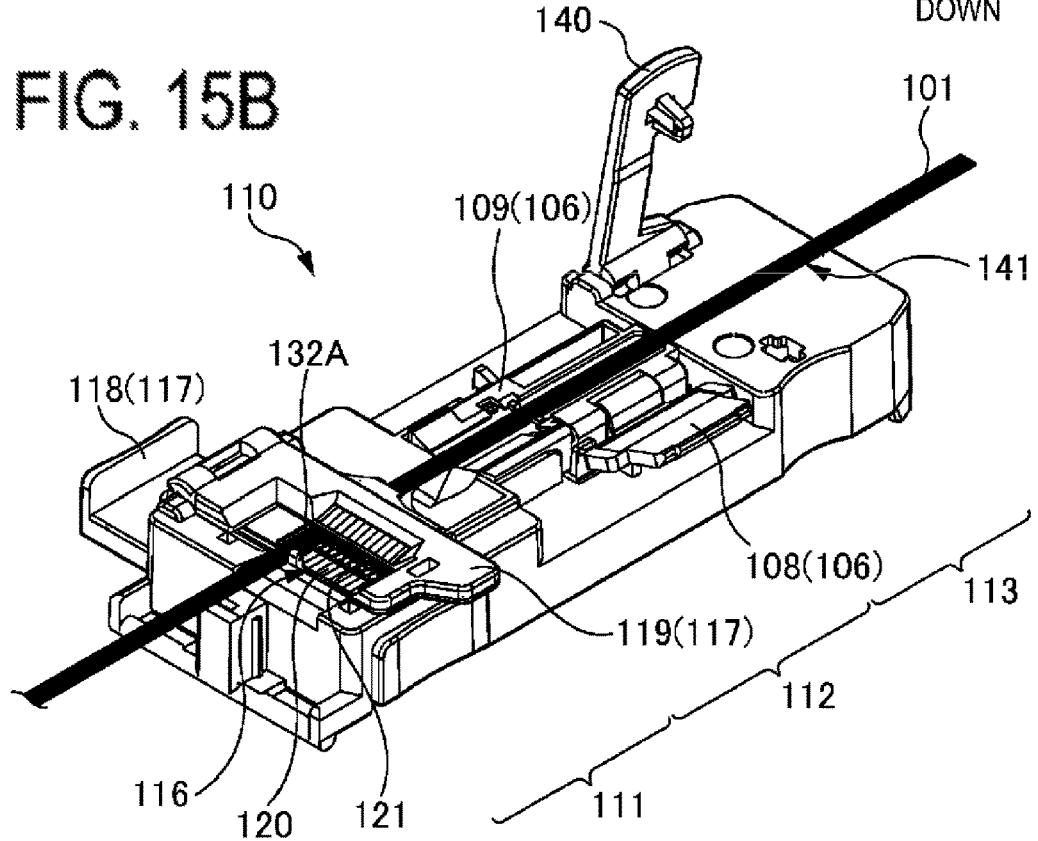

(FIRST MODIFICATION)

(SECOND MODIFICATION)

OPTICAL FIBER ALIGNMENT TOOL AND METHOD OF SETTING OPTICAL FIBERS IN FIBER HOLDER

BACKGROUND

Technical Field

The present invention relates to an optical fiber alignment tool and a method of setting optical fibers in a fiber holder.

Related Art

In recent years, field installable optical connectors have been proposed that can be easily assembled in a terminal end of an optical fiber cord at a fiber optic installation site. As an example of such a field installable optical connector, there is a fusion splicing type field installable optical connector that includes an internal optical fiber inserted and fixed in a ferrule in advance at a factory, and that is to be assembled a terminal end of an internal optical fiber and a terminal end of an optical fiber in the optical fiber cord by fusion splicing.

For example, Patent Literature 1 discloses, a fusion splicing type of field installable optical connector in which a ferrule has a plurality of internal optical fibers and which is to be assembled terminal ends of a plurality of internal optical fibers and terminal ends of a plurality of optical fibers in an optical fiber cord by fusion splicing (see FIGS. 41 and 42 of Patent Literature 1).

PATENT LITERATURE

Patent Literature 1: JP 2015-508188 T

When a fusion splicing type of field installable optical connector is assembled at a terminal end of an optical fiber cord, it is necessary that a plurality of optical fibers exposed from the optical fiber cord are arranged and hold in predetermined order. However, it is difficult to do align and hold a plurality of optical fibers in predetermined order at the fiber optic installation site by hand working, resulting in decrease in workability.

SUMMARY

One or more embodiments can increase workability in aligning and holding a plurality of optical fibers in predetermined order One or more embodiments provide an optical fiber alignment tool configured to align a plurality of optical fibers, the optical fiber alignment tool comprising a fiber aligner configured to align the plurality of optical fibers in predetermined order and a fiber holding portion configured to sandwich the plurality of optical fibers in a direction (i.e., alignment direction) in which the plurality of optical fibers is aligned and to hold the plurality of optical fibers, while maintaining the predetermined order.

Other features of the present invention will be apparent by the specification described below and drawings.

Advantageous Effects of Invention

According to one or more embodiments of the present invention, it is possible to increase workability in aligning and holding a plurality of optical fibers in predetermined order.

BRIEF DESCRIPTION OF THE DRAWINGS

FIGS. 4A to 4D are explanatory diagrams illustrating states before and after a plurality of optical fibers 1 are gathered by the optical fiber alignment tool 10 according to the first embodiment.

FIGS. 12A to 12D are explanatory diagrams illustrating states before and after a plurality of optical fibers 101 are gathered by the optical fiber alignment tool 110 according to the second embodiment.

FIG. 14A is an explanatory diagram illustrating a state in which a main body side lid 119 is closed in the main body portion 111 in the gathering state. FIG. 14B is an explanatory diagram illustrating a state in which the main body side lid 119 is opened in the main body portion 111 in the gathering state.

FIG. 15A is a perspective view illustrating a state in which the optical fibers 101 are inserted into fiber insertion portions 122. FIG. 15B is a perspective view illustrating a state in which the plurality of optical fibers 101 are gathered.

Figure 1A:
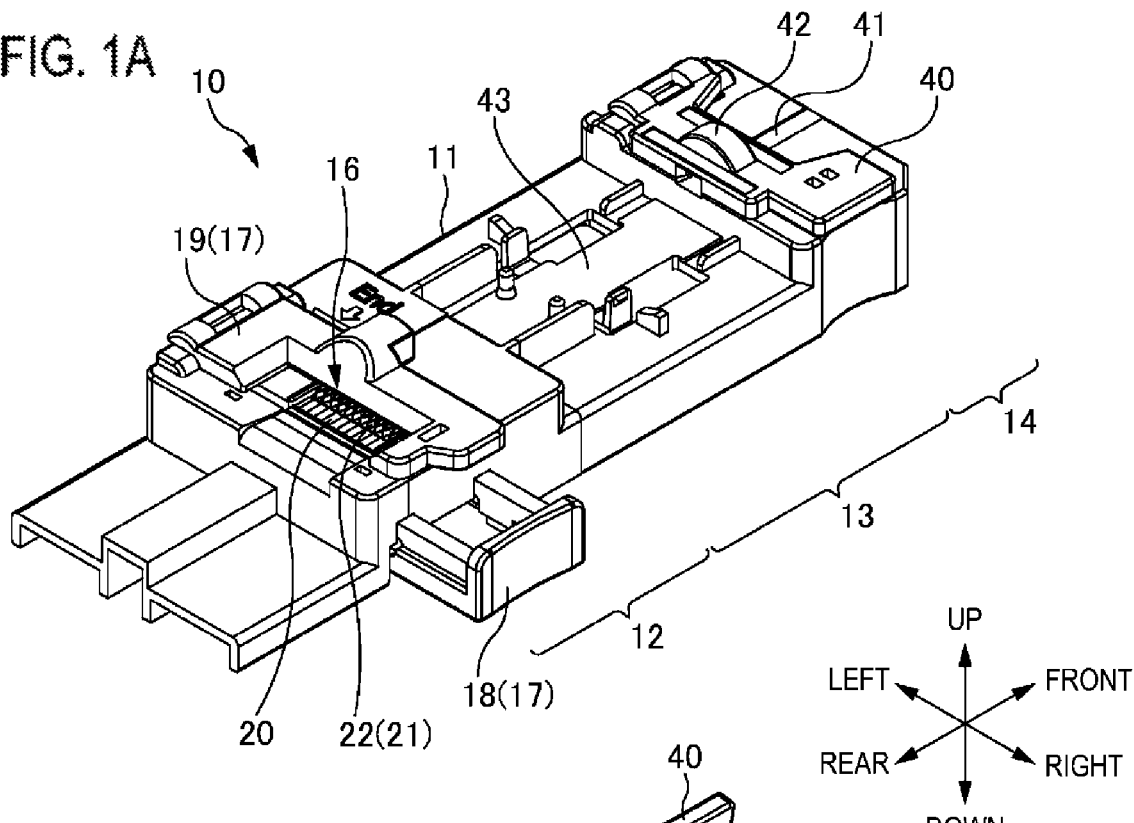
FIGS. 1A and 1B are perspective views of an optical fiber alignment tool 10 according to a first embodiment in an initial state.

18B is a perspective view of the main body portion 111 of the optical fiber alignment tool 110 according to a second modification.

DETAILED DESCRIPTION

At least the following matters will be apparent by the specification described below and drawings.

(1) An optical fiber alignment tool configured to align a plurality of optical fibers, including a fiber aligner configured to align the plurality of optical fibers in predetermined order and a fiber holding portion configured to sandwich and hold the plurality of optical fibers in the direction of the plurality of optical fibers arranged, while maintaining the predetermined order, will be disclosed. With the optical fiber alignment tool, workability in aligning and holding a plurality of optical fibers in the predetermined order can be increased.

The fiber aligner includes a plurality of separators provided in the direction of the plurality of optical fibers arranged. This makes it possible to align the plurality of optical fibers in predetermined order.

The fiber aligner includes a plurality of fiber insertion portions each provided among the separators, and one of the plurality of optical fibers is inserted into each of the plurality of fiber insertion portions. This makes it possible to align the plurality of optical fibers in predetermined order.

A tapered portion is formed in the fiber insertion portion on a side of the plurality of optical fibers inserted. This makes it possible to easily insert the optical fibers into the fiber insertion portions.

The fiber holding portion includes a mount portion on which the plurality of optical fibers are placed in a case where the fiber holding portion sandwiches and holds the plurality of optical fibers in the alignment direction (direction in which the plurality of optical fibers is aligned). This makes it possible to sandwich and hold the plurality of optical fibers in the alignment direction, while maintaining the predetermined order of the plurality of optical fibers.

The fiber holding portion is configured to sandwich and hold the plurality of optical fibers in a direction perpendicular to a direction of an optical axis of the plurality of optical fibers and the direction in which the plurality of optical fibers are aligned, in a case where the fiber holding portion sandwiches and holds the plurality of optical fibers in the alignment direction. This makes it possible to sandwich and hold the plurality of optical fibers in the alignment direction, while maintaining the predetermined order of the plurality of optical fibers.

The plurality of optical fibers are movable in the alignment direction, in a case where the fiber holding portion sandwiches and holds the plurality of optical fibers in the alignment direction. This makes it possible to sandwich and hold the plurality of optical fibers in the alignment direction, while maintaining the predetermined order of the plurality of optical fibers.

The plurality of separators not protruding with respect to a mount surface of the mount portion on which the plurality of optical fibers are placed is configured to move the plurality of optical fibers in the alignment direction. This makes it possible to sandwich and hold the plurality of optical fibers in the alignment direction, while maintaining the predetermined order of the plurality of optical fibers.

The optical fiber alignment tool further includes a holder holding portion, and a fiber holder configured to hold the plurality of optical fibers in the predetermined order is placed in the holder holding portion. This makes it possible to increase workability in aligning and holding a plurality of optical fibers in predetermined order.

The optical fiber alignment tool further includes a front holding portion configured to hold the plurality of optical fibers, and the holder holding portion is provided sandwiched between the fiber aligner and the front holding portion. This makes it possible to increase work efficiency in aligning and holding a plurality of optical fibers in predetermined order.

(2) Incidentally, when a fusion splicing type field installable optical connector is assembled at a terminal end of an optical fiber cord, it is necessary to align in predetermined order and at a predetermined pitch, a plurality of optical fibers exposed from the optical fiber cord, and to hold the predetermined order and the predetermined pitch of the plurality of optical fibers. However, at the fiber optic installation site, it is difficult to align and hold a plurality of optical fibers in predetermined order and at a predetermined pitch by hand working, resulting in decrease in workability.

An optical fiber alignment tool is configured to align a plurality of optical fibers, the optical fiber alignment tool including a fiber aligner configured to align the plurality of optical fibers in predetermined order and a fiber holding portion configured to assemble and hold the plurality of optical fibers, while maintaining the predetermined order of the plurality of optical fibers, the fiber aligner including a separator configured to partition a space among the plurality of optical fibers aligned in the predetermined order, and the separator being retractable from between the plurality of optical fibers. With the optical fiber alignment tool, it is possible to increase workability in aligning and holding a plurality of optical fibers in predetermined order and at a predetermined pitch.

Retraction of the separator from between the plurality of the optical fibers allows the fiber retainer to sandwich and hold the plurality of optical fibers in a alignment direction. This makes it possible to hold the plurality of optical fibers in a state of being aligned at a predetermined pitch.

The fiber aligner includes a plurality of fiber insertion portions each provided among the separators, and the plurality of optical fibers are inserted into the plurality of fiber insertion portions. This makes it possible to align the plurality of optical fibers in predetermined order.

The plurality of fiber insertion portions are formed widening toward a side of the plurality of optical fibers inserted. This makes it possible to easily insert the optical fibers into the fiber insertion portions.

The fiber holding portion includes an arm, and the plurality of optical fibers are placed on the arm both before the separator is retracted from between the plurality of optical fibers and after the separator is retracted from between the plurality of optical fibers. This makes it possible to move the plurality of optical fibers in the alignment direction, while maintaining the predetermined order of the plurality of optical fibers.

The plurality of optical fibers are sandwiched in a direction perpendicular to both of a direction of an optical axis of the plurality of optical fibers and the alignment direction, in a case where the fiber holding portion sandwiches and holds the plurality of optical fibers in the alignment direction. This makes it possible to move the plurality of optical fibers in the alignment direction, while maintaining the predetermined order of the plurality of optical fibers.

The plurality of optical fibers are movable in the alignment direction, in a case where the fiber holding portion sandwiches and holds the plurality of optical fibers in the alignment direction. This makes it possible to assemble the plurality of optical fibers in the alignment direction, while maintaining the predetermined order of the plurality of optical fibers.

The plurality of optical fibers are movable in the alignment direction, after the separator is retracted from between the plurality of optical fibers. This makes it possible to assemble the plurality of optical fibers in the alignment direction, while maintaining the predetermined order of the plurality of optical fibers.

The optical fiber alignment tool further includes a holder mount portion, and a fiber holder configured to hold the plurality of optical fibers in the predetermined order and at a predetermined pitch is placed in the holder mount portion. This makes it possible to increase workability in aligning and holding a plurality of optical fibers in predetermined order and at a predetermined pitch.

The optical fiber alignment tool further includes a front holding portion configured to hold the plurality of optical fibers, and the holder mount portion is provided sandwiched between the fiber aligner and the front holding portion. This makes it possible to increase workability in aligning and holding a plurality of optical fibers in predetermined order and at a predetermined pitch.

A method of setting optical fibers in a fiber holder using an optical fiber alignment tool configured to align a plurality of optical fibers is disclosed. In this method, the optical fiber alignment tool includes a fiber aligner configured to align the plurality of optical fibers in predetermined order and a fiber holding portion configured to assemble and hold the plurality of optical fibers, while maintaining the predetermined order of the plurality of optical fibers, the fiber aligner includes a separator configured to partition a space among the plurality of optical fibers aligned in the predetermined order, and the method includes aligning the plurality of optical fibers in the predetermined order and retracting the separator from between the plurality of optical fibers. With the method of setting an optical fiber in a fiber holder, it is possible to increase workability in aligning and holding a plurality of optical fibers in predetermined order and at a predetermined pitch.

(3) An optical fiber alignment tool configured to align a plurality of optical fibers, including a fiber aligner configured to align the plurality of optical fibers in predetermined order and a fiber holding portion configured to assemble and hold the plurality of optical fibers, while maintaining the predetermined order of the plurality of optical fibers, is further disclosed. In the optical fiber alignment tool, the fiber aligner includes a separator configured to partition a space among the plurality of optical fibers aligned in the predetermined order, and the separator is retractable from between the plurality of optical fibers, and the fiber holding portion includes a stopper configured to restrict the separator from returning again to a position at which the separator partitions a space among the plurality of optical fibers, after the separator is retracted from between the plurality of optical fibers. With the optical fiber alignment tool, it is possible to inhibit the separator from pinching the optical fibers and damaging the optical fibers.

In a case where the fiber holding portion assembles and holds the plurality of optical fibers in the alignment direction, the plurality of optical fibers are sandwiched in a direction perpendicular to both of a direction of an optical axis of the plurality of optical fibers and the direction in which the plurality of optical fibers are aligned, and the stopper restricts the separator from moving in the direction of the plurality of optical fibers sandwiched. This makes it possible to inhibit the separator from pinching the optical fibers and damaging the optical fibers.

The fiber holding portion includes a slider configured to assemble and hold the plurality of optical fibers after the separator is retracted from between the plurality of optical fibers, and the stopper is configured to restrict the slider from causing the separator to return to a position at which the separator partitions a space among the plurality of optical fibers. This makes it possible to inhibit the separator from pinching the optical fibers and damaging the optical fibers.

The fiber holding portion includes a lid configured to sandwich and hold the plurality of optical fibers in the direction perpendicular to both of a direction of an optical axis of the plurality of optical fibers and the direction in which the plurality of optical fibers are aligned, and the lid includes a protrusion, the slider includes an engagement portion, and the engagement portion is configured to engage with the protrusion, in a case where the separator is moved in the direction of the plurality of optical fibers sandwiched. This makes it possible to inhibit the separator from pinching the optical fibers and damaging the optical fibers.

A restriction on movement of the separator by the stopper is removed in a case where the lid is opened. This allows the slider to be returned to the initial position.

First Embodiment

<Overall Configuration of Optical Fiber Alignment Tool 10>

Figure 1B:
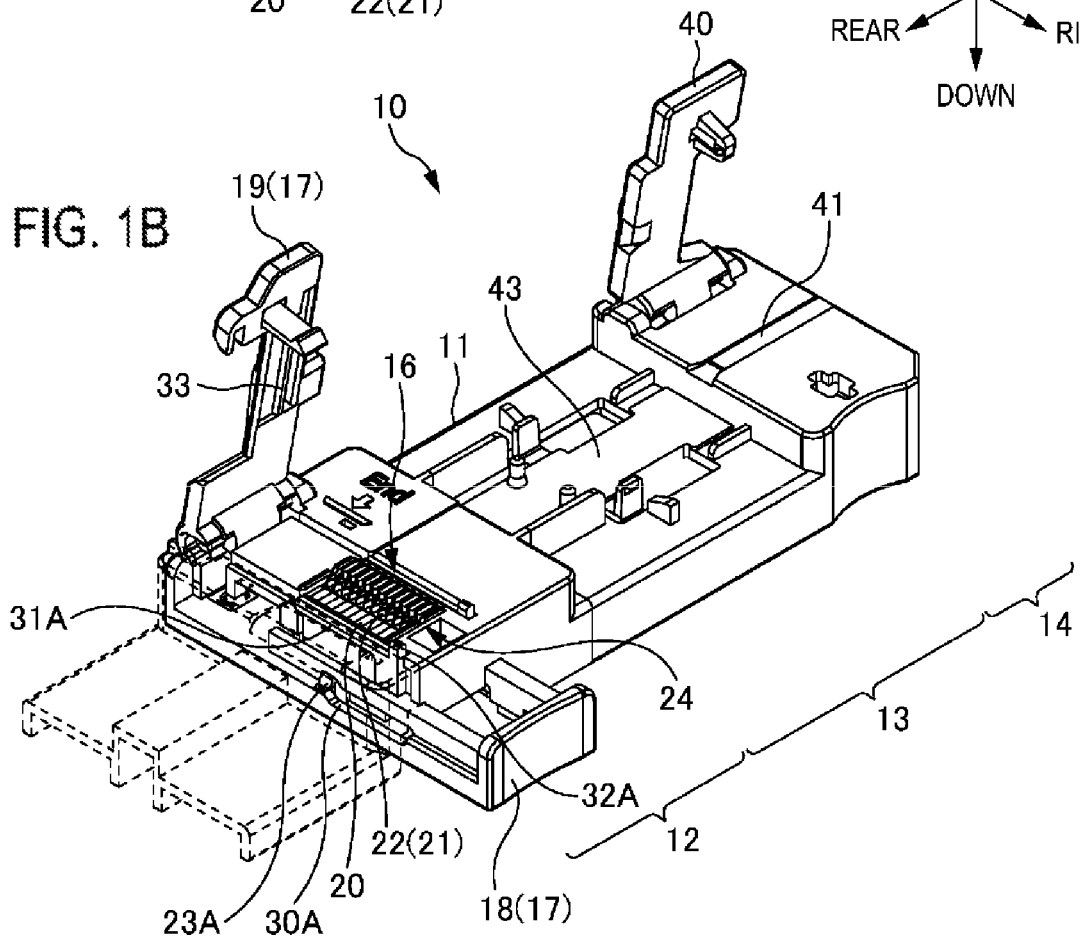
Figure 2:
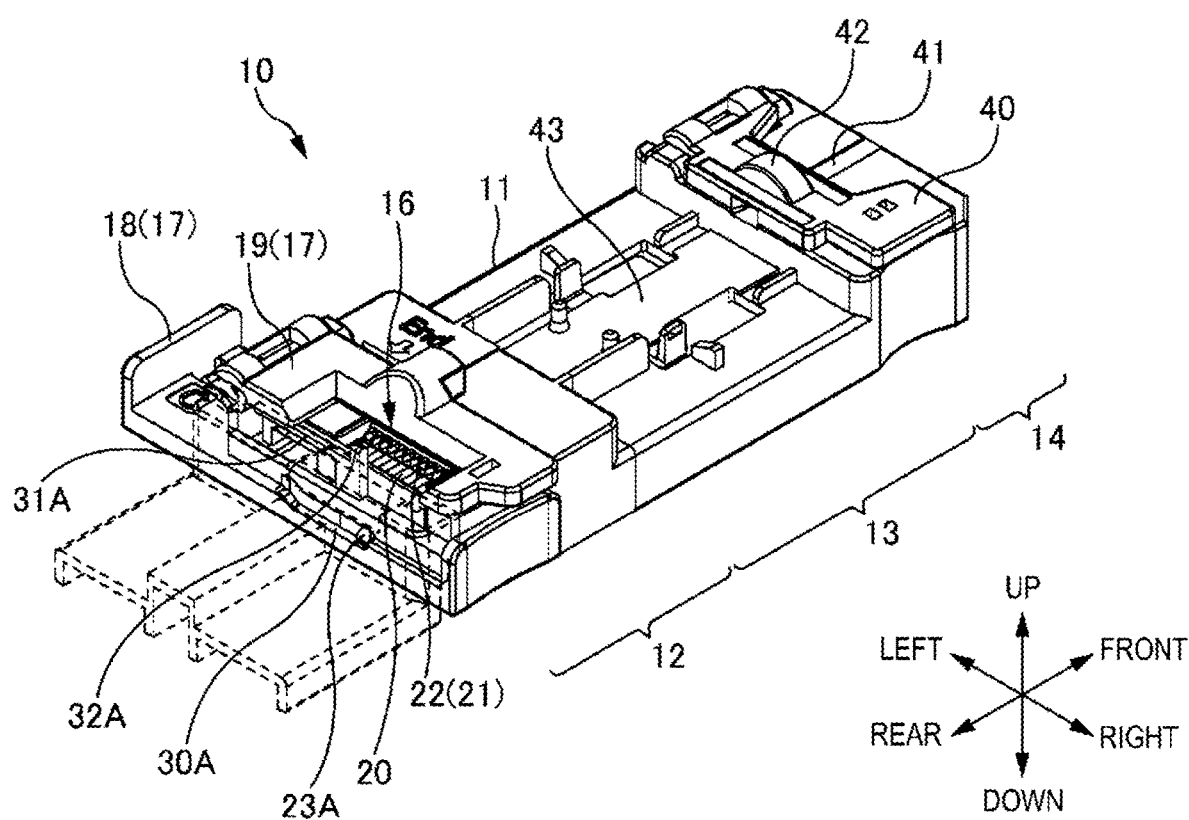
FIG. 2 is a perspective view of the optical fiber alignment tool 10 according to the first embodiment in a gathering state.

FIGS. 1A and 1B are perspective views of an optical fiber alignment tool 10 according to a first embodiment in an initial state. FIG. 2 is a perspective view of the optical fiber alignment tool 10 according to the first embodiment in a gathering state. Note that in FIGS. 1B and 2, a part of a housing 11 of the optical fiber alignment tool 10 is omitted.

In the following description, explanation may be made in accordance with directions illustrated in FIGS. 1A to 2. Specifically, the direction of the optical axis of optical fibers 1 held by the optical fiber alignment tool 10 is referred to as a front-rear direction. As described below, in the optical fiber alignment tool 10 according to the first embodiment, a main body portion 12, a holder holding portion 13, and a front holding portion 14 are provided in this order in the front-rear direction. A side on which the front holding portion 14 is located with respect to the holder holding portion 13 is referred to as the "front side" and a side on which the main body portion 12 is located with respect to the holder holding portion 13 is referred to as the "rear side". Furthermore, a direction perpendicular to the bottom surface of an accommodating portion 43 of the holder holding portion 13 is referred to as an "up-down direction". A side on which a fiber holder 6 (not illustrated in FIGS. 1A to 2. See FIGS. 6A and 6B, which will be described below) is accommodated is referred to as "upside" and an opposite side thereto is referred to as "downside", as viewed from the bottom surface of the accommodating portion 43. In addition, a direction perpendicular to the front-rear direction and the up-down direction is referred to as a "left-right direction". As described below, in the optical fiber alignment tool 10 according to the first embodiment, a slider 18 is provided so as to be slidable in the left-right direction with respect to the housing 11. For this reason, the left-right direction may also be referred to as a "sliding direction". Furthermore, as described below, in the optical fiber alignment tool 10 according to the first embodiment, the plurality of optical fibers 1 are arranged in the left-right direction. Thus, the left-right direction may also be referred to as a "fiber alignment direction" or simply an "alignment direction".

Furthermore, the right side as viewed from rear to front is referred to as the "right", and the left side is the "left". Note that a hinge side of a main body side lid 19 (or a hinge side of a front lid 40) is "left" and the opening and closing side is "right".

The optical fiber alignment tool 10 is a tool that allows the plurality of optical fibers 1 to be aligned in predetermined order and to be gathered. Furthermore, the optical fiber alignment tool 10 is also a tool that holds the plurality of optical fibers 1 in a gathered state. The plurality of optical fibers 1 can be easily set in the fiber holder 6 by the optical fiber alignment tool 10 is used to align the plurality of optical fibers 1 in predetermined order, gather the plurality of optical fibers 1, and hold the plurality of optical fibers 1 in a gathered state.

The fiber holder 6 (not illustrated in FIGS. 1A to 2, refer FIGS. 6A and 6B described below) used in the first embodiment is a member that holds the plurality of optical fibers 1 in a state of being aligned in predetermined order. Since the plurality of optical fibers 1 in an optical fiber cord are held in a state of being aligned in predetermined order by using the fiber holder 6, processing such as cover removal or cleaving (cutting) can be performed collectively on the plurality of optical fibers 1. Furthermore, since the plurality of optical fibers 1 in an optical fiber cord are held in a state of being aligned in predetermined order by using the fiber holder 6, fusion splicing between the plurality of optical fibers 1 and a plurality of internal optical fibers inserted into and fixed to a ferrule can also be performed collectively.

To collectively perform fusion splicing between the plurality of optical fibers 1 and the plurality of internal optical fibers, the plurality of optical fibers 1 need not only to be held in a state of being aligned in predetermined order, but also to be held, by using the fiber holder 6, in a state of being arranged at a predetermined pitch. With the optical fiber alignment tool 10 according to the first embodiment, the plurality of optical fibers 1 can be held in a state in which each of the optical fibers 1 are arranged at a predetermined pitch and set in the fiber holder 6. In the following description, the plurality of optical fibers 1 in a state in which the optical fibers 1 are arranged at a predetermined pitch may be referred to as "gathering state (of the optical fibers 1)". In the first embodiment, as illustrated in FIGS. 4C and 6B described below, the plurality of optical fibers 1 in the gathering state are contact with the adjacent optical fibers each other and are arranged in one direction (in this case, the left-right direction). However, as long as the pitch between the optical fibers 1 in the gathering state is equal to the pitch between the internal optical fibers to which the optical fibers 1 are connected using fusion splicing (i.e., the pitch between a plurality of grooves formed in the fiber holder 6, which is described below), the adjacent optical fibers 1 may not be in contact with each other. For example, when the plurality of optical fibers 1 are in the gathering state, the plurality of optical fibers 1 need only to be gathered and arranged in one direction (in this case, the left-right direction), and the adjacent optical fibers 1 may not be in contact with each other.

Note that "gathering state" may refer to a state of the optical fiber alignment tool 10 in which the plurality of optical fibers 1 are held in a state of being arranged at a predetermined pitch. Furthermore, a position of each element (for example, a fiber aligner 16 or the slider 18 described below) of the optical fiber alignment tool 10 in the gathering state may be referred to as a "gathering position". FIG. 2 illustrates the optical fiber alignment tool 10 according to the first embodiment in the gathering state, in which the fiber aligner 16 and the slider 18 are positioned at the gathering position.

An initial state of the optical fiber alignment tool 10 in operation of setting the plurality of optical fibers 1 in the fiber holder 6 may be referred to as an "initial state". Furthermore, a position of each element (for example, the fiber aligner 16 or the slider 18 described below) of the optical fiber alignment tool 10 in the initial state may be referred to as an "initial position". FIGS. 1A and 1B illustrate the optical fiber alignment tool 10 according to the first embodiment in the initial state, in which the fiber aligner 16 and the slider 18 are positioned at the initial position.

The optical fiber alignment tool 10 includes the main body portion 12, the holder holding portion 13, and the front holding portion 14. The main body portion 12, the holder holding portion 13, and the front holding portion 14 are parts provided to the housing 11 of the optical fiber alignment tool 10. The main body portion 12, the holder holding portion 13, and the front holding portion 14 are provided in this order in the front-rear direction. In other words, the main body portion 12, the holder holding portion 13, and the front holding portion 14 are provided along the direction of the optical axis of the optical fibers 1 held by the optical fiber alignment tool 10.

The main body portion 12 is a part that is configured to align the plurality of optical fibers 1 in predetermined order and to be gathered. The main body portion 12 is also a part that holds the plurality of optical fibers 1 in a gathered state. The main body portion 12 is provided rearward of the holder holding portion 13.

The main body portion 12 includes the fiber aligner 16 and a fiber holding portion 17 fiber.

The fiber aligner 16 is a part configured to align the plurality of optical fibers 1 in predetermined order. The fiber aligner 16 is accommodated in the housing 11. Note that the fiber aligner 16 is provided so as to be movable in the up-down direction with respect to the housing 11. Furthermore, the fiber aligner 16 is sandwiched by the slider 18 (an arm 31A and an arm 31B) of the fiber holding portion 17. The detailed configuration and operation of the fiber aligner 16 will be described below.

The fiber holding portion 17 is a part configured to be gathered the plurality of optical fibers 1. The fiber holding portion 17 is also a part that holds the plurality of optical fibers 1 in a state of being gathered. The detailed configuration and operation of the fiber holding portion 17 will be described below.

The holder holding portion 13 is a part that holds the fiber holder 6 (not illustrated in FIGS. 1A to 2, refer FIGS. 6A and 6B described below). The holder holding portion 13 is provided forward of the main body portion 12 and is provided rearward of the front holding portion 14. As illustrated in FIGS. 1A to 2, the holder holding portion 13 is provided with the accommodating portion 43 in which the fiber holder 6 is to be accommodated. Once the fiber holder 6 is accommodated in the accommodating portion 43, positioning the fiber holder 6 with respect to the optical fiber alignment tool 10 can be achieved. In the first embodiment, each of the plurality of optical fibers 1 held by the optical fiber alignment tool 10 is accommodated in a corresponding one of a plurality of grooves formed in the fiber holder 6. Thus, each of the plurality of optical fibers 1 can be easily accommodated in a corresponding one of the plurality of grooves formed in the fiber holder 6 by the fiber holder 6 positioned with respect to the optical fiber alignment tool 10.

The front holding portion 14 is a part that holds the plurality of optical fibers 1. The front holding portion 14 is provided forward of the holder holding portion 13. The front holding portion 14 is provided with the front lid 40 and a front groove 41. The front lid 40 is a part that clamps the plurality of optical fibers 1 from above. The front groove 41 is a part in which the plurality of optical fibers 1 are placed. Once the front lid 40 clamps the plurality of optical fibers 1 placed in the front groove 41, the plurality of optical fibers 1 can be held.

Note that, in the first embodiment, the front lid 40 is formed of a transparent resin configured to transmit an optical signal. Furthermore, a lens 42 is formed on the front lid 40. Since the front lid 40 is formed of a transparent resin that transmits an optical signal, an operator can view the alignment state (order) of the plurality of optical fibers 1 through the front lid 40. Additionally, The alignment state (order) of the plurality of optical fibers 1 can be easily checked by enlarged view of the alignment state of the plurality of the optical fibers 1 by forming the lens 42.

<Main Body Portion 12>

Figure 3:
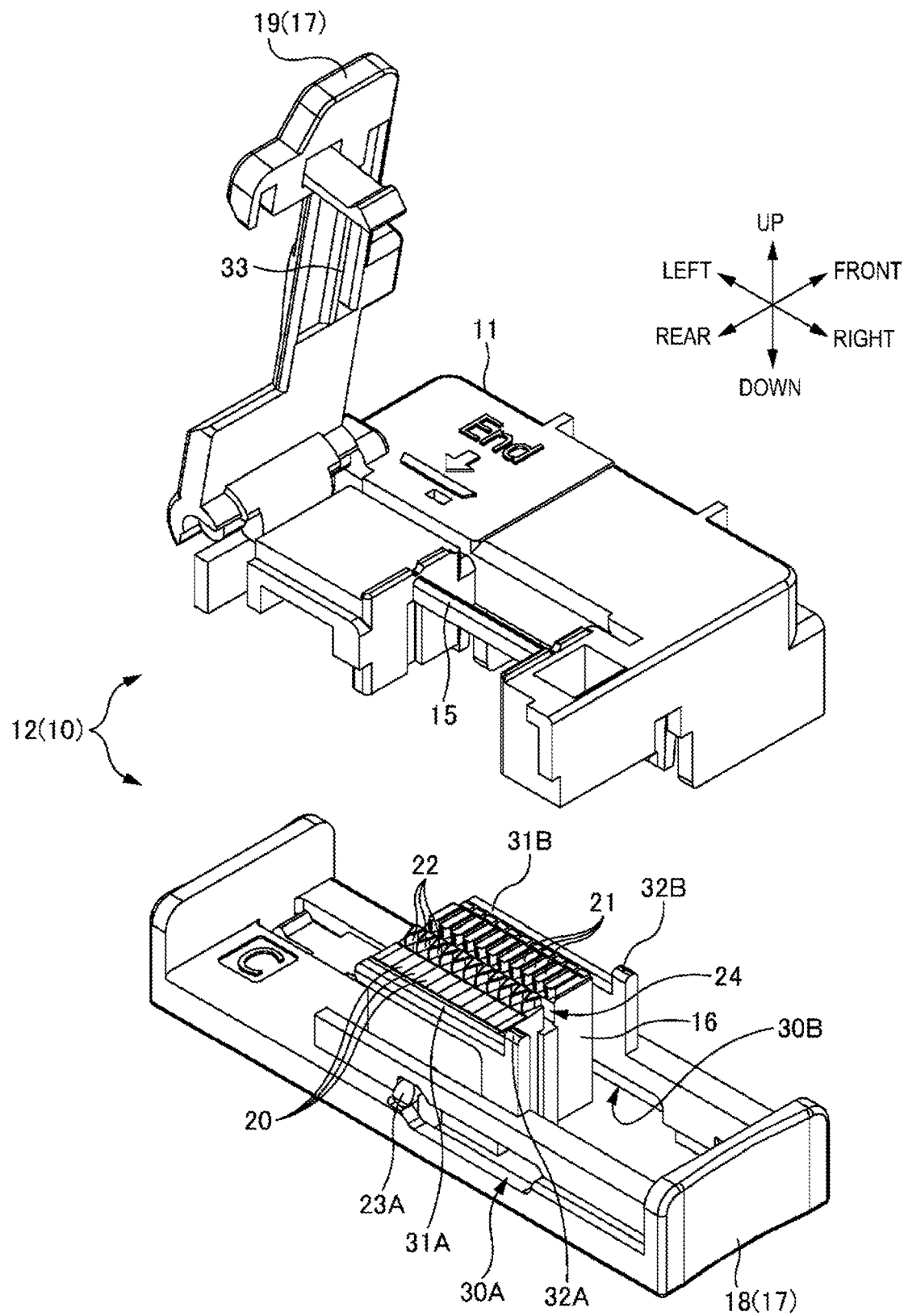
FIG. 3 is an exploded perspective view of a main body portion 12 in the initial state.

FIG. 3 is an exploded perspective view of the main body portion 12 in the initial state. FIGS. 4A to 4D are explanatory diagrams illustrating states before and after the plurality of optical fibers 1 are gathered by the optical fiber alignment tool 10 according to the first embodiment.

As described above, in the optical fiber alignment tool 10 according to the first embodiment, the main body portion 12 includes the fiber aligner 16 and the fiber holding portion 17. As described above, the fiber aligner 16 is a part configured to align the plurality of optical fibers 1 in predetermined order. As described above, the fiber holding portion 17 is a part configured to gather the plurality of optical fibers 1 and to hold the plurality of optical fibers 1 in a state of being gathered.

Fiber Aligner 16

The fiber aligner 16 is provided with an identification portion 20, a separator 21, and pins 23 (a pin 23A and a pin 23B).

The identification portion 20 is a part for identifying each of the plurality of optical fibers 1 during insertion of the plurality of optical fibers 1 into the fiber aligner 16. A plurality of the identification portions 20 are provided in the left-right direction, and are each colored in correspondence with identification colors of the plurality of optical fibers 1. As described below, a plurality of fiber insertion portions 22 are provided in the left-right direction in correspondence with the plurality of identification portions 20. By inserting each of the optical fibers 1 into the fiber insertion portion 22 provided in the vicinity of the identification portion 20 having the same color as the identification color of the optical fiber 1, the operator can easily insert the plurality of optical fibers 1 into the respective fiber insertion portions 22 in predetermined order. Note that as illustrated in FIG. 3, in the main body portion 12 of the first embodiment, the plurality of identification portions 20 are provided rearward of the plurality of fiber insertion portions 22. As a result, when inserting the optical fibers 1 from the rear side toward the front side, it is possible to easily homologize between the identification colors of the optical fibers 1 and colors of the identification portion 20. However, as long as the identification portions 20 are provided in the vicinity of the fiber insertion portions 22 such that correspondence between the identification colors of the optical fibers 1 and the colors of the identification portion 20 can be easily made, the plurality of identification portions 20 may not be provided rearward of the plurality of fiber insertion portions 22.

The separator 21 is a part that assorts the plurality of optical fibers 1 into each other. The separator 21 is provided as a wall extending in the front-rear direction. In the first embodiment, to assort the plurality of optical fibers 1 (in this case, 12 optical fibers) exposed from an optical fiber cord into one by one, a plurality of the separators 21 (in this case, 11 separators) are provided. The plurality of separators 21 are lined up in the left-right direction, and a space formed by each the separators 21 serves as the fiber insertion portion 22. However, at the ends of the fiber aligner 16 in the left-right direction, the fiber insertion portion 22 is formed between the separator 21 and the housing 11. By inserting each of the plurality of optical fibers 1 into one of the plurality of fiber insertion portions 22 (in this case, 12 fiber insertion portions) formed as described above, it is possible to assort the plurality of optical fibers 1 into each other. Note that, the number of the fiber insertion portions 22 (the separators 21) can be varied depending on the number of the optical fibers 1 exposed from the optical fiber cord. Note that, as illustrated in FIG. 3, in the first embodiment, when the main body side lid 19 described below is closed, a groove 24 extending in the left-right direction is formed in the separator 21. A wall 24 is a part in which a protrusion 33 of the main body side lid 19 described below is accommodated.

As described above, the identification portion 20 is configured to insert the plurality of optical fibers 1 into the respective fiber insertion portions 22 in predetermined order. A space formed by each of the fiber insertion portions 22 is partitioned by the separator 21. Thus, when the plurality of optical fibers 1 are inserted into the fiber insertion portions 22, a space between the optical fibers 1 is partitioned by the separator 21. As a result, the plurality of optical fibers 1 can be aligned in predetermined order.

Note that, as illustrated in FIG. 3, in the first embodiment, a tapered portion is formed on the rear side of the separator 21. Specifically, the tapered portion is formed so as to have the width in the left-right direction decreasing from front to rear. As a result, the fiber insertion portion 22 is formed so as to widen toward the side (rear side) on which the optical fibers 1 are inserted. Thus, the optical fibers 1 can be easily inserted into the fiber insertion portions 22.

The pin 23 is a part that protrudes from the fiber aligner 16. In the first embodiment, two of the pins 23 (the pin 23A and the pin 23B) are provided. The pin 23A is provided on the rear side of the fiber aligner 16, and the pin 23B is provided on the front side of the fiber aligner 16. In FIG. 3, the pin 23B is not illustrated. The pins 23 (the pin 23A and the pin 23B) are inserted into rails 30 (30A and 30B) provided in the slider 18 described below. Note that the pins 23 are provided so as to be movable with respect to the rails 30. The pins 23 can move along the rails 30, which allows movement of the entire fiber aligner 16.

Fiber Holding Portion 17

The fiber holding portion 17 includes the slider 18 and the main body side lid 19.

The slider 18 is a part for switching the state of the optical fiber alignment tool 10 between the initial state and the gathering state. The slider 18 is provided so as to be movable in a left-right direction with respect to the housing 11.

The slider 18 is provided with the rails 30 (the rail 30A and rail 30B), the arms 31 (the arm 31A and arm 31B), and shoulders 32 (shoulder 32A and shoulder 32B).

The rail 30 is a part into which the pin 23 of the fiber aligner 16 is inserted. In the first embodiment, two of the rails 30 (the rail 30A and rail 30B) are provided. The rail 30A is provided on the rear side of the slider 18, and the rail 30B is provided on the rear side of the slider 18. The pin 23A is inserted into the rail 30A, and the pin 23B is inserted into the rail 30B. As described above, the pin 23A and the pin 23B are provided so as to be movable with respect to the rail 30A and the rail 30B, respectively.

As illustrated in FIGS. 4A and 4C, the rail 30 includes an upper rail section 44, a slope section 45, and a lower rail section 46. In FIGS. 4A and 4C, although an upper rail section 44A, a slope section 45A, and a lower rail section 46A of the rail 30A are illustrated, an upper rail section 44B, a slope section 45B, and a lower rail section 46B of the rail 30B are not illustrated. The upper rail section 44, the slope section 45, and the lower rail section 46 integrally form an opening, and the pin 23 can freely move from the upper rail section 44 to the lower rail section 46 through the slope section 45.

The upper rail section 44 is a section of the rail 30 where the pin 23 is positioned when the fiber aligner 16 is in the initial position. The upper rail section 44 is located at a higher position than that of the lower rail section 46. When the pin 23 is positioned at the upper rail section 44, the fiber aligner 16 is in the initial position and each of the plurality of optical fibers 1 can be inserted into a corresponding one of the plurality of fiber insertion portions 22. After the plurality of optical fibers 1 are inserted into the plurality of fiber insertion portions 22, the optical fibers 1 are separated from each other by the separators 21, and the predetermined order of the plurality of optical fibers 1 is maintained.

The slope section 45 is a section of the rail 30 where the pin 23 is positioned while the fiber aligner 16 moves between the initial position and the gathering position. The slope section 45 is a section that connects the upper rail section 44 and the lower rail section 46. As described above, the upper rail section 44 is located at a higher position than that of the lower rail section 46. Thus, the slope section 45 is a section sloping from the upper rail section 44 to the lower rail section 46.

The lower rail section 46 is a section of the rail 30 where the pin 23 is positioned when the fiber aligner 16 is in the gathering position. The lower rail section 46 is located at a lower position than that of the upper rail section 44. When the pin 23 is positioned in the lower rail section 46, the fiber aligner 16 is in the gathering position, the separators 21 have been moved to a lower position, and the optical fibers 1 are not separated from each other. However, the plurality of optical fibers 1 are in a state of being sandwiched between a bridge 15 described below and the protrusion 33 of the main body side lid 19, and thus the predetermined order of the plurality of optical fibers 1 is maintained.

The arm 31 is a place on which the plurality of optical fibers 1 are placed. In the first embodiment, both when in the initial position and in the gathering position, the plurality of optical fibers 1 are placed on the arm 31. Note that the arm 31 may also be referred to as a placement portion 31. In other words, as described below, even in the gathering state after the separators 21 have moved to a lower position, the plurality of optical fibers 1 remain placed on the arm 31. As illustrated in FIG. 3, in the first embodiment, two of the arms 31 (the arm 31A and the arm 31B) are provided. Each of the arms 31 is formed extending to the left at the upper end of the slider 18. The optical fibers 1 are placed on a top surface (hereinafter, also referred to as a "mount surface") of each of the arm 31A and the arm 31B.

The shoulder 32 is a part that holds the plurality of optical fibers 1 in a sandwiched state, together with the housing 11. The shoulder 32 is a part that protrudes upward at the right end of the arm 31. In the first embodiment, two of the shoulders 32 (the shoulder 32A and the shoulder 32B) are provided. The shoulder 32A protrudes from the arm 31A, and the shoulder 32B protrudes from the arm 31B. As illustrated in FIG. 4C, in the first embodiment, the shoulder 32 holds the plurality of optical fibers 1 in a sandwiched state, together with the housing 11, when in the gathering state.

The main body side lid 19 is a part that sandwiches the plurality of optical fibers 1 in the up-down direction, together with the bridge 15 of the housing 11. As illustrated in FIGS. 4B and 4D, the plurality of optical fibers 1 are sandwiched and held between the protrusion 33 provided in the main body side lid 19 and the bridge 15 provided in the housing 11 in both states of the initial position and the gathering position. As a result, the plurality of optical fibers 1 are sandwiched and held from the initial state to the gathering state, and thus the predetermined order of the plurality of optical fibers 1 is maintained. However, as described below, after the separators 21 are moved to a lower position until the gathering state, the plurality of optical fibers 1 can be moved in the left-right direction, while maintaining the predetermined order.

<Operation of Main Body Portion 12>

FIGS. 4A and 4B illustrate the optical fiber alignment tool 10 in the initial state, in which the plurality of optical fibers 1 are inserted into the fiber insertion portions 22 (the fiber aligner 16). FIG. 4A is a side view of the optical fiber alignment tool 10 as viewed from rear to front. FIG. 4B illustrates a cross-sectional view of the optical fiber alignment tool 10 when the optical fiber alignment tool 10 is cut along a plane perpendicular to the left-right direction.

As illustrated in FIG. 4A, the slider 18 in the initial state is positioned on the right side. In this state, the pin 23 is positioned on the left end of the upper rail section 44. As a result, the bottom surface of the fiber aligner 16 is positioned above the mount surface of the arm 31 on which the optical fibers 1 are placed, and in this state, the separators 21 can assort the plurality of optical fibers 1 into each other. In other words, the operator can insert the plurality of optical fibers 1 into the respective fiber insertion portions 22 individually. In other words, the operator can randomly insert the plurality of optical fibers 1 into the respective fiber insertion portions 22.

When the operator slides the slider 18 to the left from the initial state illustrated in FIGS. 4A and 4B, the pin 23 moves from the upper rail section 44 to the slope section 45. As described above, the slope section 45 is a section that connects the upper rail section 44 and the lower rail section 46, and is sloped from the upper rail section 44 to the lower rail section 46. Thus, the pin 23 moves through the slope section 45 along with a sliding of the slider 18. Thus, as the pin 23 moves through the slope section 45, the pin 23 (the fiber aligner 16) moves downward with respect to the slider 18. In other words, as the pin 23 moves through the slope section 45, the separators 21 move downward.

FIGS. 4C and 4D illustrate the optical fiber alignment tool 10 in the gathering state. FIG. 4C is a side view of the optical fiber alignment tool 10 as viewed from rear to front. FIG. 4D illustrates a cross-sectional view of the optical fiber alignment tool 10 when the optical fiber alignment tool 10 is cut along a plane perpendicular to the left-right direction.

When the operator further slides the slider 18 to the left from the above-described state, the pin 23 moves from the slope section 45 to the lower rail section 46. As a result, the bottom surface of the fiber aligner 16 is positioned below the mount surface of the arm 31 on which the optical fibers 1 are placed, and in this state, the separators 21 no longer assort the plurality of optical fibers 1 into each other. In other words, the plurality of optical fibers 1 can be moved in the left-right direction. However, as described above, the plurality of optical fibers 1 are sandwiched and held between the protrusion 33 and the bridge 15 in the up-down direction, and thus the predetermined order of the plurality of optical fibers 1 remains maintained.

As illustrated in FIG. 4D, the slider 18 in the gathering state is positioned on the left side. In this state, the pin 23 is positioned on the right end of the lower rail section 46. As a result, the shoulder 32 and the housing 11 sandwich and hold the plurality of optical fibers 1. In other words, the plurality of optical fibers 1 are sandwiched and held in the direction in which the plurality of optical fibers 1 are arranged (the left-right direction), and the predetermined order of the plurality of optical fibers 1 remains maintained.

<Method of Setting Plurality of Optical Fibers 1 in Fiber Holder 6 (Set Procedure)>

Figure 5:
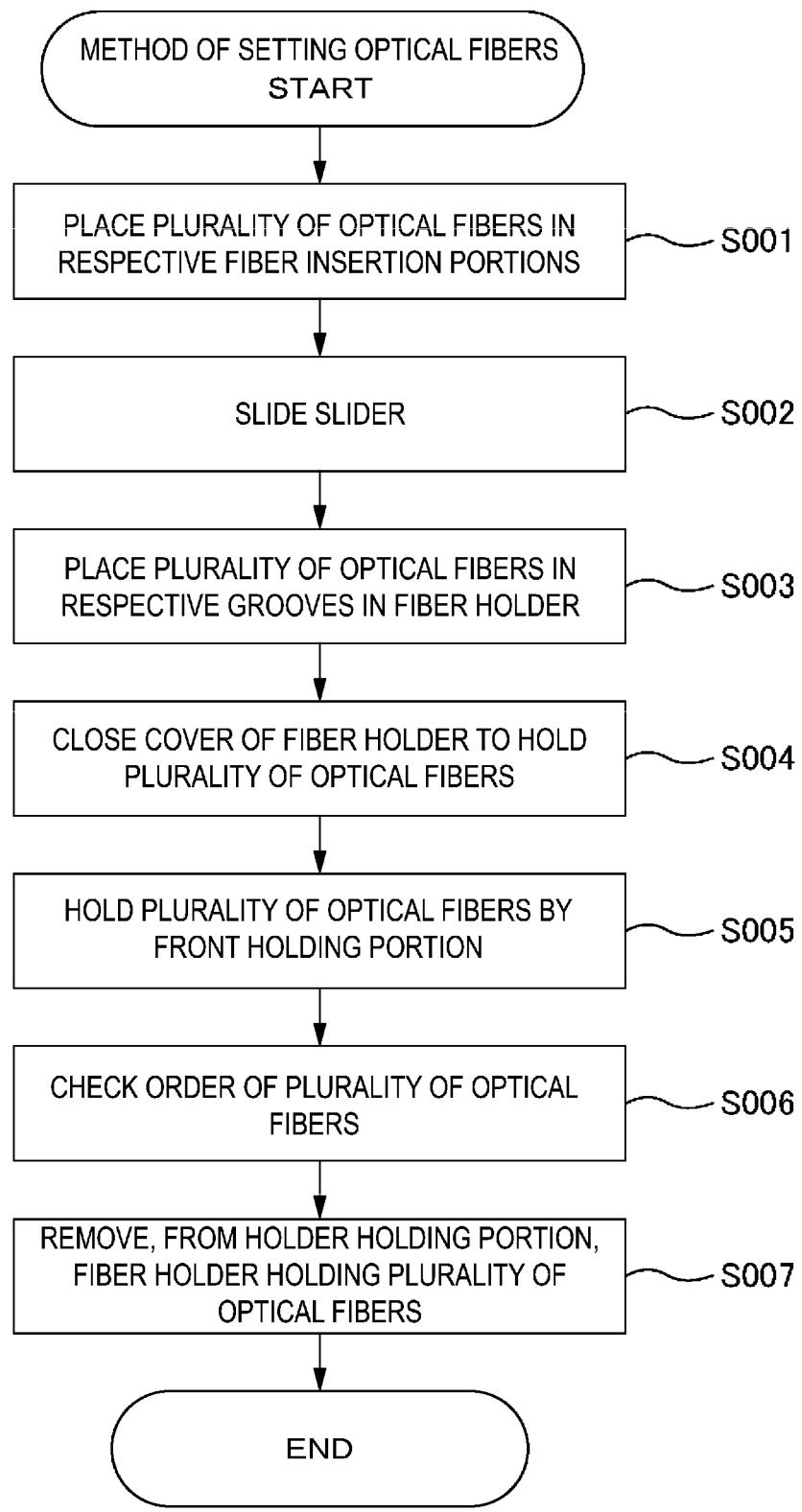
FIG. 5 is a flow chart of a set method (set procedure) for setting the plurality of optical fibers 1 in a fiber holder 6 by using the optical fiber alignment tool 10 according to the first embodiment.

FIG. 5 is a flow chart of a set method (set procedure) for setting the plurality of optical fibers 1 in the fiber holder 6 by using the optical fiber alignment tool 10 according to the first embodiment.

First, the operator accommodates the plurality of optical fibers 1 into the respective fiber insertion portions 22 (S101). Before the operator accommodates the plurality of optical fibers 1 into the respective fiber insertion portions 22, the operator checks that the optical fiber alignment tool 10 is in the initial state. In other words, the operator checks that the slider 18 is positioned on the right side, as illustrated in FIG. 4A. In the initial state, the bottom surface of the fiber aligner 16 is positioned above the mount surface of the arm 31 on which the optical fibers 1 are placed, and in this state, the separators 21 can assort the plurality of optical fibers 1 into each other. Thus, in this state, the operator can randomly insert the plurality of optical fibers 1 into the respective fiber insertion portions 22.

Figure 6A:
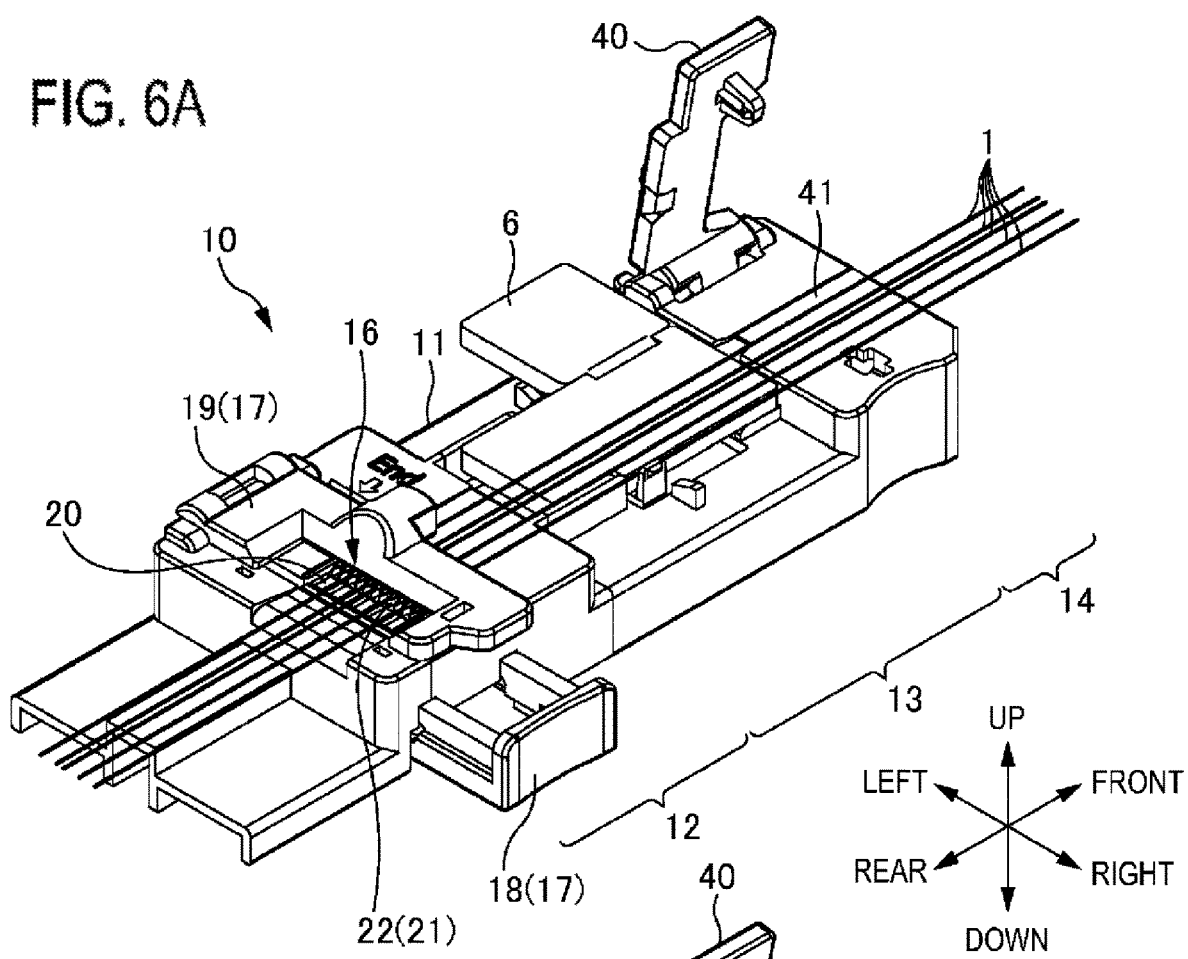
FIG. 6A is a perspective view illustrating a state in which the optical fibers 1 are inserted into fiber insertion portions 22.
Figure 6B:
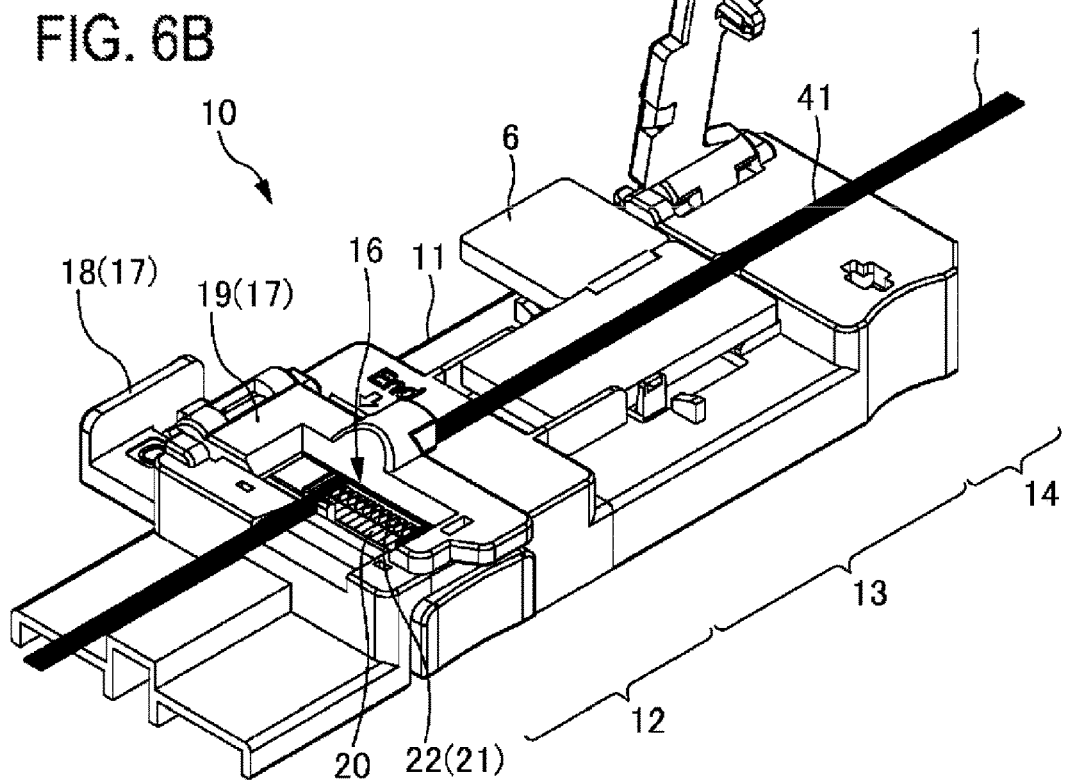
FIG. 6B is a perspective view illustrating a state in which the plurality of optical fibers 1 are gathered.

FIG. 6A is a perspective view illustrating a state in which the optical fibers 1 are inserted into fiber insertion portions 22. As described above, in the first embodiment, the plurality of fiber insertion portions 22 (in this case, 12 fiber insertion portions) are provided. The space between the fiber insertion portions 22 is partitioned by the separator 21. Thus, the operator can randomly insert the plurality of optical fibers 1 into the respective fiber insertion portions 22. In other words, it is not necessary to insert the optical fibers 1 in order starting with the rightmost of the plurality of fiber insertion portions 22. As illustrated in FIG. 6A, it is possible to insert the optical fiber 1 into any of the fiber insertion portions 22. At this time, as described above, each of the optical fibers 1 is inserted into a predetermined one of the fiber insertion portions 22 such that correspondence between the identification color of the optical fiber 1 and the color of the identification portion 20 is made. As a result, the plurality of optical fibers 1 can be easily aligned in predetermined order.

Subsequently, the operator slides the slider 18 (S102). The operator slides the slider 18 located on the right side in the initial state, to the left. Thus, the pin 23 is moved from the upper rail section 44 to the slope section 45. As a result, as the pin 23 moves through the slope section 45, the pin 23 (the fiber aligner 16) moves downward with respect to the slider 18. In other words, as the pin 23 moves through the slope section 45, the separators 21 moves downward. When the operator further slides the slider 18 to the left, the pin 23 is moved from the slope section 45 to the lower rail section 46. As a result, the bottom surface of the fiber aligner 16 is positioned below the mount surface of the arm 31 on which the optical fibers 1 are placed. In other words, the plurality of optical fibers 1 can be moved in the left-right direction while maintaining the predetermined order. When the slider 18 is slid to the gathering position, the plurality of optical fibers 1 can be held in a sandwiched state in the direction in which the plurality of optical fibers 1 are arranged, while maintaining the predetermined order of the plurality of optical fibers 1.

Subsequently, the operator accommodates the plurality of optical fibers 1 in the respective grooves of the fiber holder 6 (S103).

FIG. 6B is a perspective view illustrating a state in which the plurality of optical fibers 1 are gathered. As described above, in the gathering state, the plurality of optical fibers 1 are held in a state of being arranged at a predetermined pitch. Thus, the operator can easily accommodate the plurality of optical fibers 1 in the respective grooves of the fiber holder 6 with pressing as if stroking the plurality of optical fibers 1 from above the fiber holder 6 in front-rear direction.

Subsequently, the operator closes a cover of the fiber holder 6 to hold the plurality of optical fibers 1 (S104). As a result, the plurality of optical fibers 1 are held by the fiber holder 6.

Subsequently, the operator holds the plurality of optical fibers 1 by the front holding portion 14 (S105), and checks the order of the plurality of optical fibers 1 (S106). As described above, the front holding portion 14 is formed of a transparent resin that can transmit an optical signal, and the lens 42 formed in the front holding portion 14 allows an enlarged view of the alignment state (the order) of the plurality of optical fibers 1 to be provided, and thus the operator can easily check the alignment state (the order) of the plurality of optical fibers 1.

Finally, the operator picks up the fiber holder 6 holding the plurality of optical fibers 1 from the holder holding portion 13 (S107).

First Comparative Example

Figure 7A:
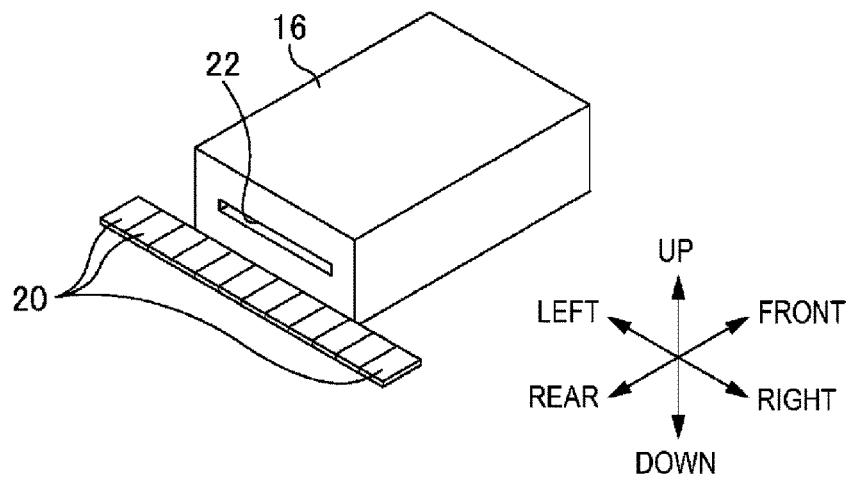
FIGS. 7A to 7C are explanatory diagrams illustrating a state in which the plurality of optical fibers 1 are inserted into a fiber insertion portion 22 of an optical fiber alignment tool 10 of a first comparative example.
Figure 7B:
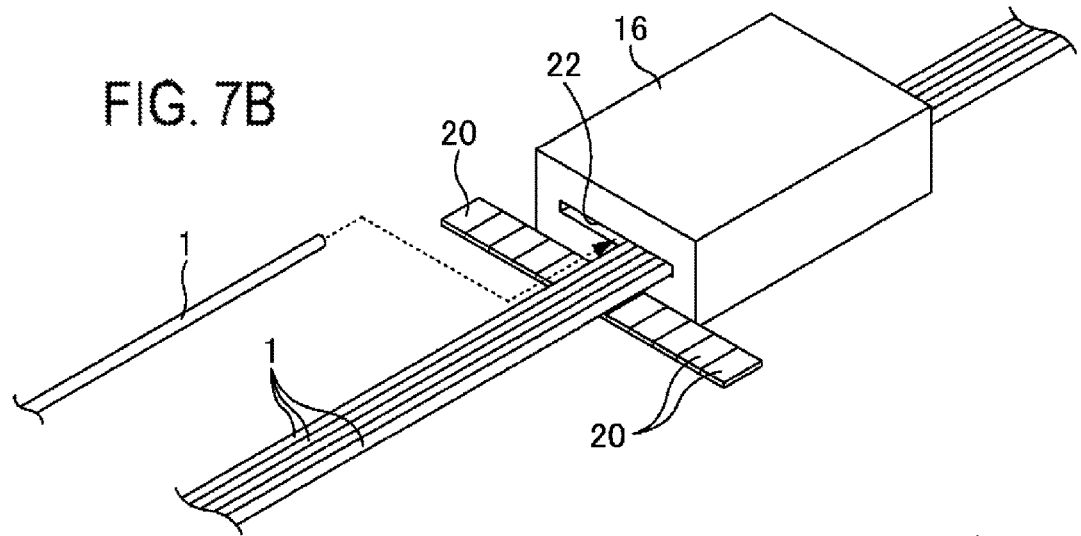
Figure 7C:
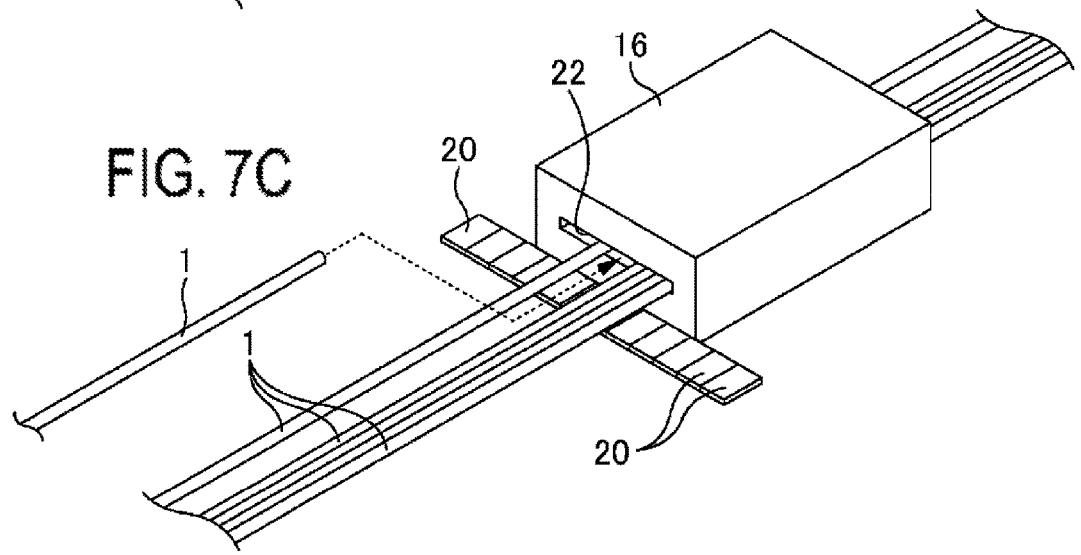

FIGS. 7A to 7C are explanatory diagrams illustrating a state in which the plurality of optical fibers 1 are inserted into a fiber insertion portion 22 of an optical fiber alignment tool 10 of a first comparative example. Note that in FIGS. 7A to 7C, only the fiber aligner 16 is illustrated for ease of explanation.

As illustrated in FIG. 7A, in the optical fiber alignment tool 10 of the first comparative example, the separator 21 is not provided in the fiber aligner 16. Thus, as illustrated in FIG. 7B, in the optical fiber alignment tool 10 of the first comparative example, all of the plurality of optical fibers 1 are inserted into the single fiber insertion portion 22 provided in the fiber aligner 16.

Incidentally, the optical fiber alignment tool 10 of the first comparative example also is configured to align the plurality of optical fibers 1 in predetermined order. The fiber insertion portion 22 is formed such that the width of the fiber insertion portion 22 in the up-down direction is approximately the same as the outer diameter of the optical fiber 1. As illustrated in FIG. 7B, the optical fibers 1 are inserted so as to be tightly arranged on the right side. As a result, once all of the plurality of optical fibers 1 are inserted, the optical fibers 1 can be in a state of being aligned in predetermined order.

However, each of the inserted optical fibers 1 tightly arranged on the right side can move in the left-right direction. Thus, as illustrated in FIG. 7C, the optical fiber 1 to be in a tightly arranged on the right side may move to the left side, and thus a space may be generated between the optical fibers 1. If the optical fiber 1 to be inserted is mistakenly inserted into the space, the optical fibers 1 are aligned in a wrong order. In particular, this occurs frequently in field installable optical connectors for manually aligning a plurality of optical fibers in predetermined order.

However, in the optical fiber alignment tool 10 according to the first embodiment, the space between the fiber insertion portions 22 is partitioned by the separator 21. Thus, in state of where the plurality of optical fibers 1 are inserted into the fiber insertion portions 22, the space between the optical fibers 1 is partitioned by the separator 21. This can prevent a space between each of the optical fibers 1 from being generated and the optical fiber 1 to be inserted from being mistakenly inserted into the space, and thus, the optical fibers 1 can be inhibited from being aligned in a wrong order. As a result, it is possible to increase workability in aligning and holding the plurality of optical fibers 1 in predetermined order.

Second Embodiment

<Overall Configuration of Optical Fiber Alignment Tool 110>

Figure 8:
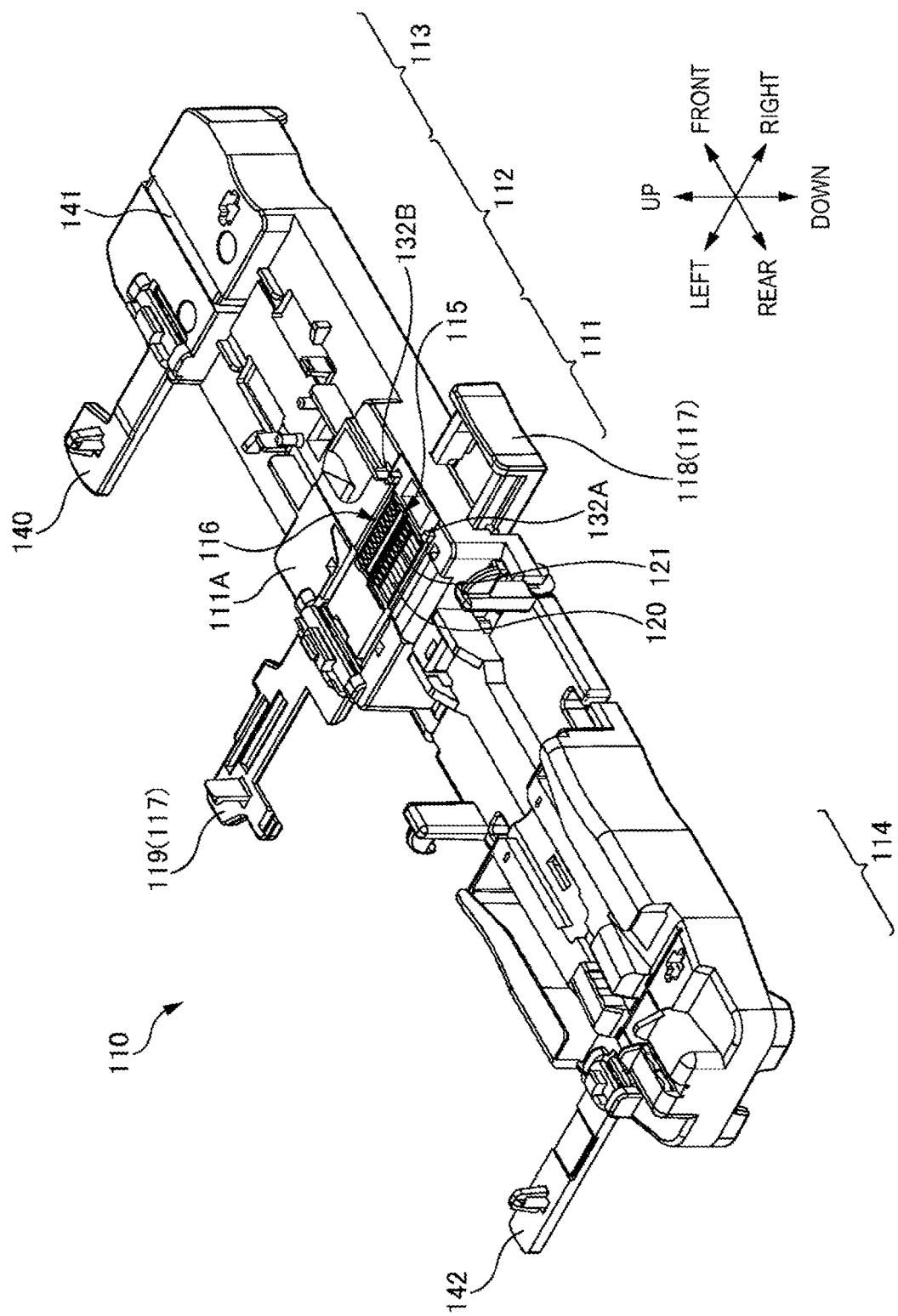
FIG. 8 is a perspective view of an optical fiber alignment tool 110 according to a second embodiment in an initial state.
Figure 9:
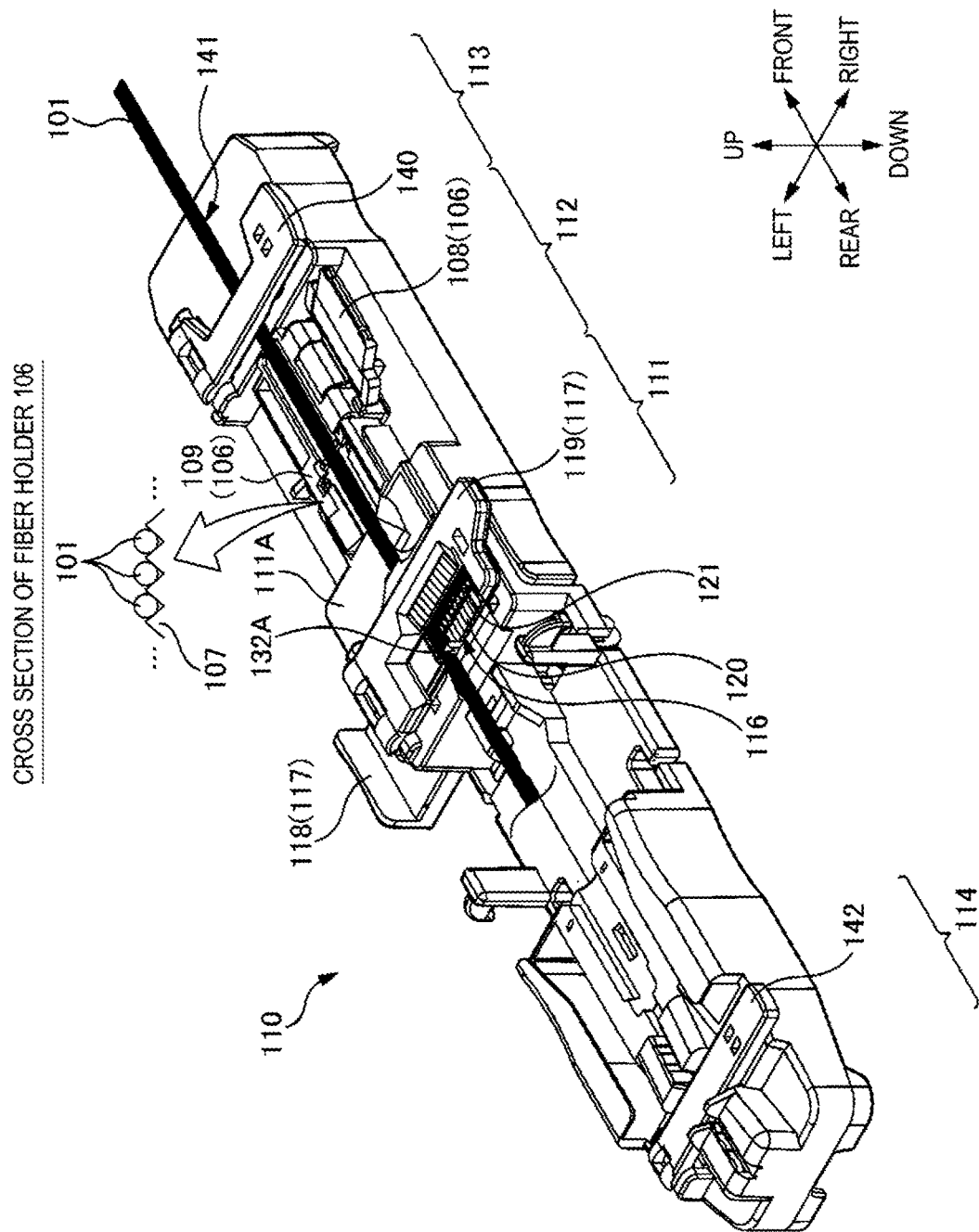
FIG. 9 is a perspective view of the optical fiber alignment tool 110 according to the second embodiment in a gathering state.

FIG. 8 is a perspective view of an optical fiber alignment tool 110 according to a second embodiment in an initial state. FIG. 9 is a perspective view of the optical fiber alignment tool 110 according to the second embodiment in a gathering state. Note that, although a fiber holder 106 and optical fibers 101 are not illustrated in FIG. 8, the fiber holder 106 and the plurality of optical fibers 101 in the gathering state are illustrated in FIG. 9. Here, the "gathering state" of the plurality of optical fibers 101 is a state in which the plurality of optical fibers 101 are aligned in predetermined order and the plurality of optical fibers 101 are assembled and held. And "gathering" the plurality of optical fibers 101 means bringing the plurality of optical fibers 101 into a gathering state.

In the following description, explanation may be made in accordance with directions illustrated in FIGS. 8 and 9. Specifically, the direction of the optical axis of optical fibers 101 held by the optical fiber alignment tool 110 is referred to as a front-rear direction. As illustrated in FIGS. 8 and 9, in the optical fiber alignment tool 110 according to the second embodiment, a main body portion 111, a holder mount portion 112, and a front holding portion 113 are provided in this order in the front-rear direction. A side on which the front holding portion 113 is located with respect to the holder mount portion 112 is referred to as the "front side" and a side on which the main body portion 111 is located with respect to the holder mount portion 112 is referred to as the "rear side". Furthermore, a direction perpendicular to the bottom surface of the holder mount portion 112 is referred to as an "up-down direction", and a side in which the fiber holder 106 is accommodated (See FIG. 9) is referred to as "upside" and an opposite side thereto is referred to as "downside", as viewed from the bottom surface of the holder mount portion 112. In addition, a direction perpendicular to the front-rear direction and the up-down direction is referred to as a "left-right direction". As described below, in the optical fiber alignment tool 110 according to the second embodiment, a slider 118 of a fiber holding portion 117 is provided so as to be slidable in the left-right direction with respect to a main body portion housing 111A. For this reason, the left-right direction may also be referred to as a "sliding direction". Furthermore, as described below, in the optical fiber alignment tool 110 according to the second embodiment, the plurality of optical fibers 101 in the gathering state are aligned in the left-right direction. Thus, the left-right direction may also be referred to as a "fiber alignment direction" or simply an "alignment direction". Furthermore, the right side as viewed from rear to front is referred to as the "right", and the left side is the "left". Note that a hinge side of a main body side lid 119 is "left", and the opening and closing side is "right".

The optical fiber alignment tool 110 is a tool for gathering the plurality of optical fibers 101. By using the optical fiber alignment tool 110 according to the second embodiment to gather the plurality of optical fibers 101, (i.e., to align the plurality of optical fibers 101 in predetermined order, and to assemble and hold the plurality of optical fibers 101), the plurality of optical fibers 101 can be easily set in the fiber holder 106 configured to align the plurality of optical fibers 101 in predetermined order and at a predetermined pitch (as described below). In other words, workability in aligning and holding the plurality of optical fibers 101 in predetermined order and at a predetermined pitch (setting the plurality of optical fibers 101 in the fiber holder 106) can be increased.

The fiber holder 106 (see FIG. 9) used in the second embodiment is a member that holds the plurality of optical fibers 101 in a state of being aligned in predetermined order and at a predetermined pitch. By holding a state of the plurality of optical fibers 101 in an optical fiber cord aligned in predetermined order and at a predetermined pitch with using the fiber holder 106, processing such as cover removal or cleaving (cutting) can be performed collectively on the plurality of optical fibers 101. Furthermore, by holding a state of the plurality of optical fibers 101 in an optical fiber cord aligned in predetermined order and at a predetermined pitch with using the fiber holder 106, a fusion splicing between the plurality of optical fibers 101 and a plurality of internal optical fibers inserted into and fixed to a ferrule can also be performed collectively.

The plurality of optical fibers 101 in the gathering state, which are held by the optical fiber alignment tool 110 according to the second embodiment, are in both of a state of being aligned in predetermined order and a state of being aligned in one direction (in this case, the left-right direction) such that the adjacent optical fibers 101 are in contact with each other (see a view on the right side of FIG. 12C described below). However, in the plurality of optical fibers 101 in the gathering state, the adjacent optical fibers 101 may not be in contact with each other. As long as the plurality of optical fibers 101 in the gathering state are in a state of being assembled and aligned in one direction (in this case, the left-right direction), the adjacent optical fibers 101 may not be in contact with each other, for example. When the plurality of optical fibers 101 are in a state of being aligned in predetermined order and in a state of being assembled and aligned in one direction, each of the plurality of optical fibers 101 can be easily accommodated in a corresponding one of a plurality of V-grooves 107 formed at a predetermined pitch in the fiber holder 106.

Note that "gathering state" may also refer to a state of the optical fiber alignment tool 110 holding the plurality of optical fibers 101 in a state of being assembled and aligned in predetermined order. Furthermore, a position of each element (for example, a fiber aligner 116 or the slider 118) of the optical fiber alignment tool 110 in the gathering state may be referred to as a "gathering position". FIGS. 9, 11, 12C, and 12D illustrate the optical fiber alignment tool 110 according to the second embodiment in the gathering state, in which the fiber aligner 116 and the slider 118 are positioned at the gathering position.

A state which is a state before the gathering state and in which the plurality of optical fibers 101 can be set in the optical fiber alignment tool 110 (specifically, a state in which the plurality of optical fibers 101 can be inserted into fiber insertion portions 122 of the fiber aligner 116), may be referred to as an "initial state". Furthermore, a position of each element (for example, the fiber aligner 116 or the slider 118 described below) of the optical fiber alignment tool 110 in the initial state may be referred to as an "initial position". FIGS. 8, 10, 12A and 12B illustrate the optical fiber alignment tool 110 according to the second embodiment in the initial state, in which the fiber aligner 116 and the slider 118 are positioned at the initial position.

The optical fiber alignment tool 110 includes the main body portion 111, the holder mount portion 112, the front holding portion 113, and a fiber clamp 114. The main body portion 111, the holder mount portion 112, and the front holding portion 113 are provided in this order in the front-rear direction. In other words, the main body portion 111, the holder mount portion 112, and the front holding portion 113 are provided along the direction of the optical axis of the optical fiber 101 held by the optical fiber alignment tool 110.

The main body portion 111 is a part configured to gather the plurality of optical fibers 101 (configured to align the plurality of optical fibers 101 in predetermined order, and gathers and holds the plurality of optical fibers 101). The main body portion 111 is provided rearward of the holder mount portion 112.

The main body portion 111 includes the main body portion housing 111A, the fiber aligner 116, and the fiber holding portion 117.

The main body portion housing 111A is a part in which the fiber aligner 116 and the fiber holding portion 117 are accommodated. The main body portion housing 111A is also a part that supports the fiber aligner 116 such that the fiber aligner 116 can be moved in the up-down direction. Furthermore, the main body portion housing 111A is a part that supports the slider 118 of the fiber holding portion 117 such that the slider 118 can be moved in the left-right direction. As illustrated in FIG. 8, a bridge 115 is provided in the main body portion housing 111A. The bridge 115 is a location on which the plurality of optical fibers 101 are placed both when in the initial state and the gathering state. The bridge 115 is a part extending in the left-right direction.

The fiber aligner 116 is a part configured to align the plurality of optical fibers 101 in predetermined order. The fiber aligner 116 is accommodated in the main body portion housing 111A. Note that the fiber aligner 116 is provided so as to be movable in the up-down direction with respect to the main body portion housing 111A. Furthermore, the fiber aligner 116 is provided so as to be sandwiched by the slider 118 (an arm 131A and an arm 131B) of the fiber holding portion 117 in the front-rear direction. The detailed configuration and operation of the fiber aligner 116 will be described below.

The fiber holding portion 117 is a part that gatherers and holds the plurality of optical fibers 101. Here, "gather and hold" means holding the plurality of optical fibers 101 to be held by the fiber holder 106, in a state of being aligned at the same pitch as the pitch of the V-grooves 107 of the fiber holder 106 or substantially the same pitch as the pitch of the V-grooves 107 of the fiber holder 106. The detailed configuration and operation of the fiber holding portion 117 will be described below.

The holder mount portion 112 is a part that holds the fiber holder 106 (see FIG. 9). The holder mount portion 112 is provided forward of the main body portion 111 and is provided rearward of the front holding portion 113. Once the fiber holder 106 is placed on (accommodated in) the holder mount portion 112, positioning (holding) the fiber holder 106 with respect to the optical fiber alignment tool 110 can be achieved. In the second embodiment, each of the plurality of optical fibers 101 held by the main body portion 111 is accommodated in a corresponding one of the plurality of V-grooves 107 formed in the fiber holder 106 (as described below). Thus, when the fiber holder 106 is positioned with respect to the optical fiber alignment tool 110, each of the plurality of optical fibers 101 can be easily accommodated in a corresponding one of the plurality of V-grooves 107 formed in the fiber holder 106.

The front holding portion 113 is a part that holds the plurality of optical fibers 101 forward of the fiber holder 106. The front holding portion 113 is provided forward of the holder mount portion 112. The front holding portion 113 includes a front cover 140 and a front groove 141. The front cover 140 is a part that clamps the plurality of optical fibers 101 from above. The front groove 141 is a part where the plurality of optical fibers 101 are placed. Once the front cover 140 clamps the plurality of optical fibers 101 placed in the front groove 41, the plurality of optical fibers 101 can be held. However, the front holding portion 113 may not be provided.

The fiber clamp 114 is a part that clamps the plurality of optical fibers 101. The fiber clamp 114 is provided as the rear most part of the optical fiber alignment tool 110. By clamping the plurality of optical fibers 101 by the fiber clamp 114, the rear parts (parts on a root side) of the plurality of optical fibers 101 can be fixed together in the optical fiber alignment tool 110. Note that the fiber clamp 114 includes a clamp cover 142 that clamps the plurality of optical fibers 101 from above.

<Detailed Configuration of Main Body Portion 111>

Figure 10:
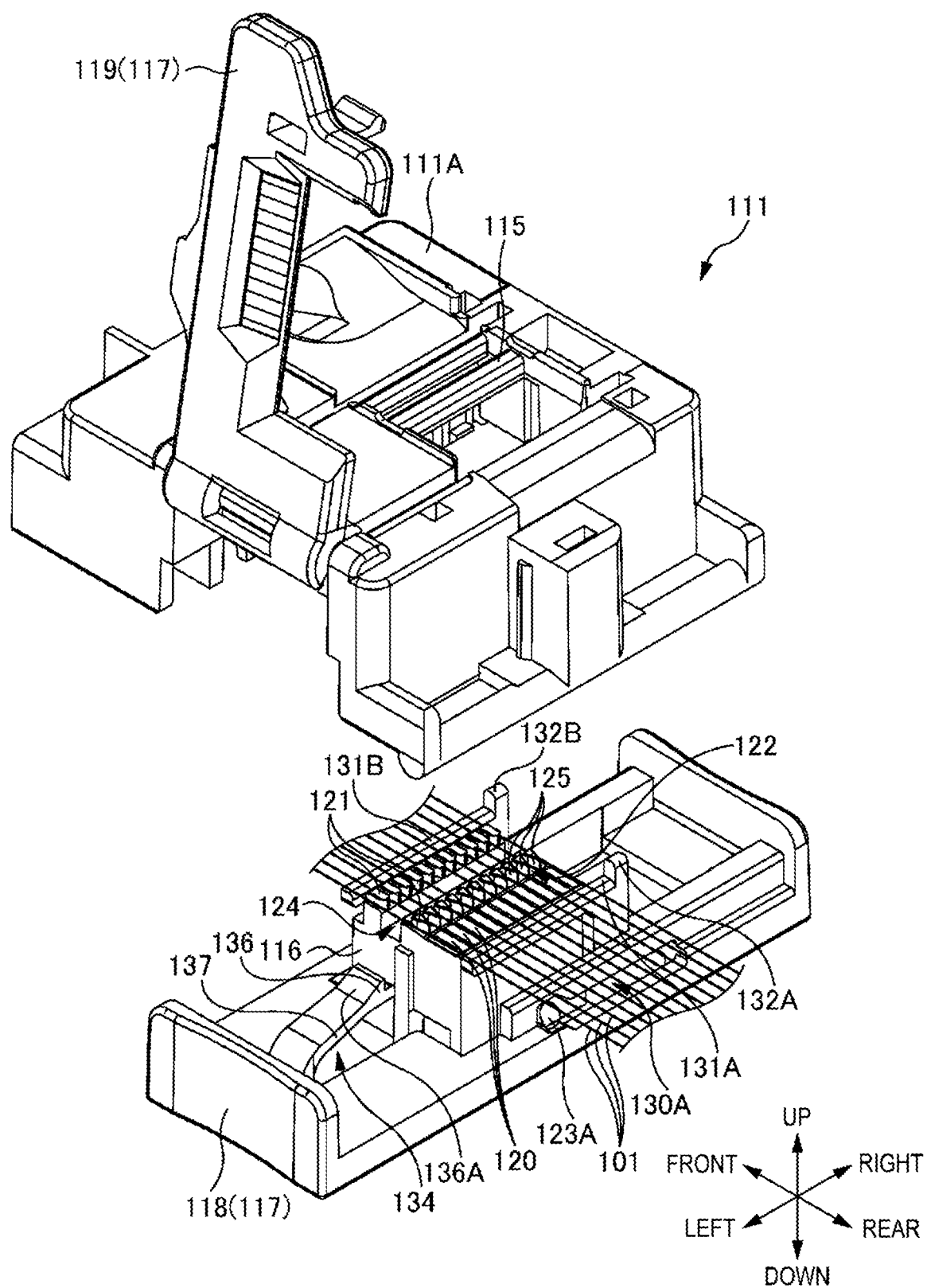
FIG. 10 is an exploded perspective view of a main body portion 111 in the initial state.
Figure 11:
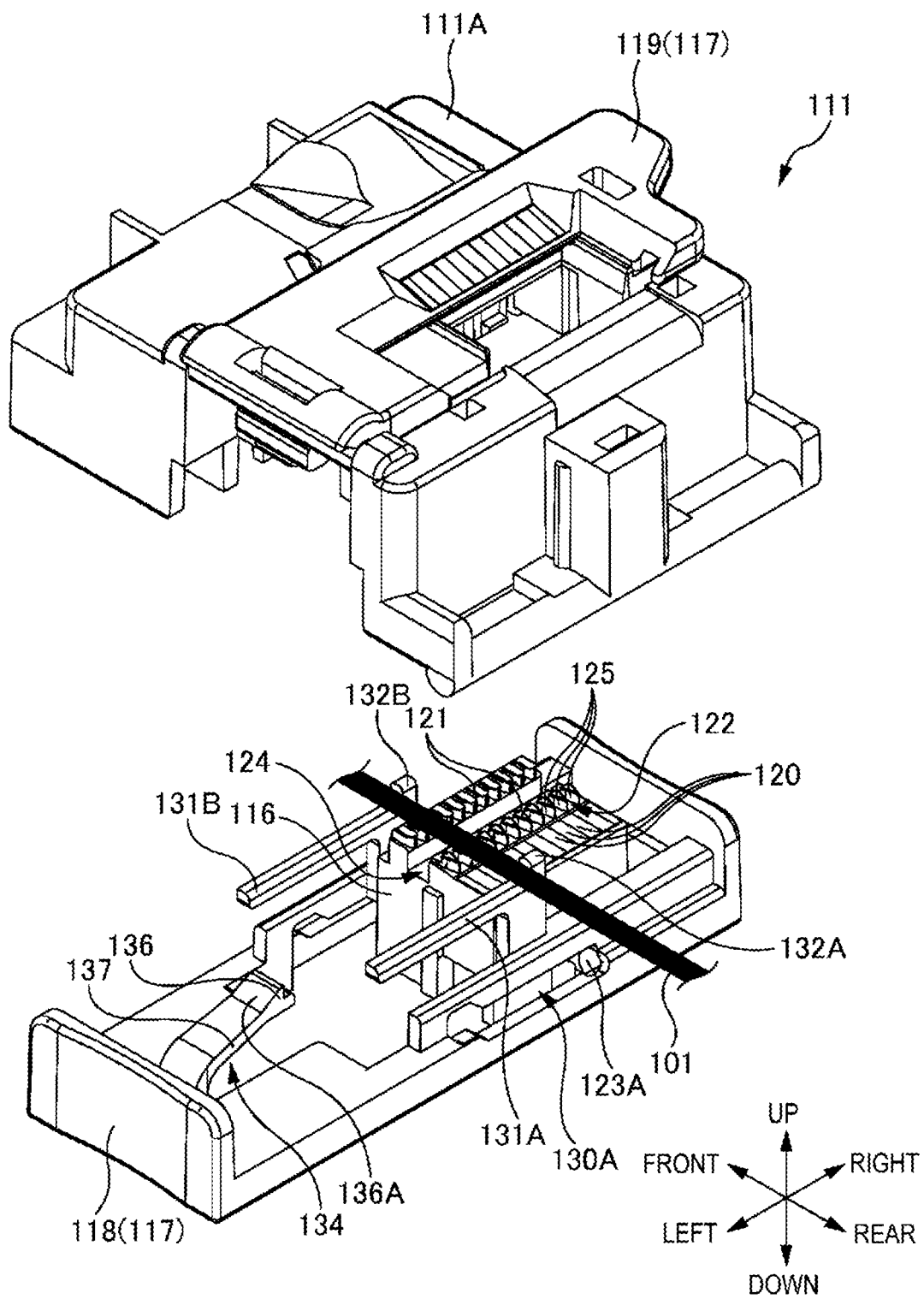
FIG. 11 is an exploded perspective view of the main body portion 111 in the gathering state.
Figure 13A:
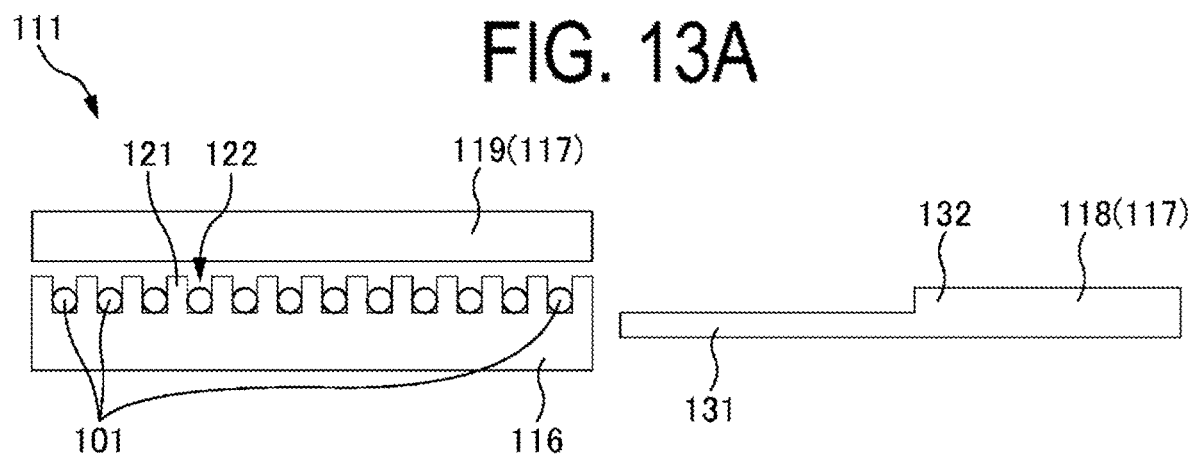
FIG. 13A is a schematic explanatory diagram of the main body portion 111 in the initial state.
Figure 13B:
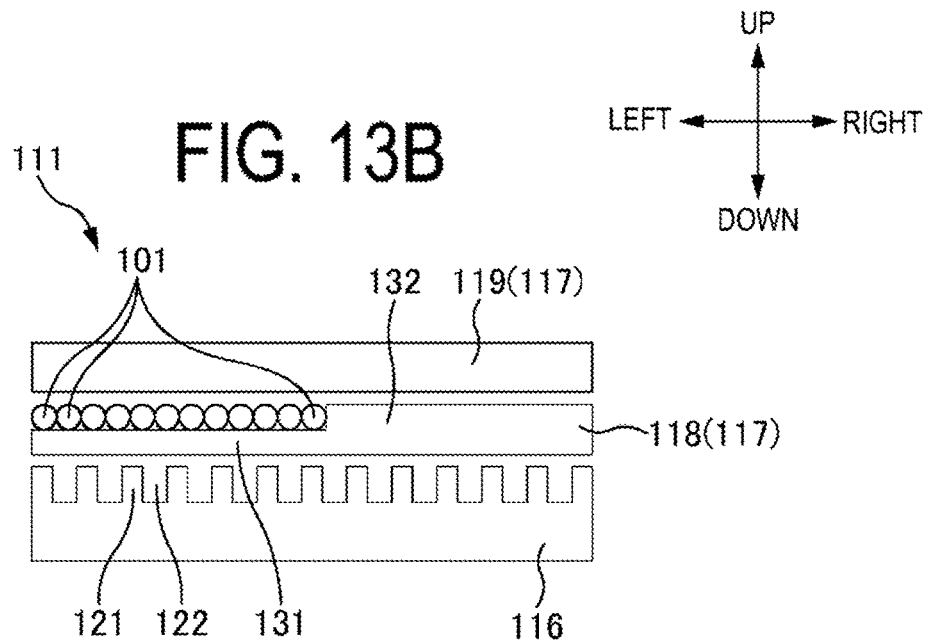
FIG. 13B is a schematic explanatory diagram of the main body portion 111 in the gathering state.

FIG. 10 is an exploded perspective view of the main body portion 111 in the initial state. FIG. 11 is an exploded perspective view of the main body portion 111 in the gathering state. FIGS. 12A to 12D are explanatory diagrams illustrating states before and after the plurality of optical fibers 101 are gathered by the optical fiber alignment tool 110 according to the second embodiment. FIG. 13A is a schematic explanatory diagram of the main body portion 111 in the initial state. FIG. 13B is a schematic explanatory diagram of the main body portion 111 in the gathering state. Note that, FIG. 10 illustrates the plurality of optical fibers 101 inserted into the fiber insertion portions 122 (described below) before being gathered. FIG. 11 illustrates the plurality of optical fibers 101 in the gathering state. As described above, in the optical fiber alignment tool 110 according to the second embodiment, the main body portion 111 includes, in addition to the main body portion housing 111A, the fiber aligner 116 that allows the plurality of optical fibers 101 to be aligned in predetermined order, and the fiber holding portion 117 that assembles and holds the plurality of optical fibers 101.

Fiber Aligner 116

The fiber aligner 116 includes an identification portion 120, a separator 121, a groove 124, and pins 123 (a pin 123A and a pin 123B).

The identification portion 120 is a part for identifying each of the plurality of optical fibers 101 during insertion of the plurality of optical fibers 101 into the fiber insertion portions 122 (described below). As illustrated in FIGS. 10 and 11, a plurality of the identification portions 120 are provided in the left-right direction, and are each colored in correspondence with identification colors of the optical fibers 101. A plurality of the fiber insertion portions 122 are provided in the left-right direction in correspondence with the plurality of identification portions 120, and thus by inserting each of the optical fibers 101 into the fiber insertion portion 122 provided corresponding to the identification portion 120 having the same color as the identification color of the optical fiber 101, the operator can easily insert the plurality of optical fibers 101 into the respective fiber insertion portions 122 in predetermined order. Note that, as illustrated in FIGS. 10 and 11, in the main body portion 111 of the second embodiment, the plurality of identification portions 120 are provided rearward of the plurality of fiber insertion portions 122 (on the near side when inserting the plurality of optical fibers 101). As a result, when inserting the optical fibers 101 from the rear side toward the front side, correspondence between the identification colors of the optical fibers 101 and colors of the identification portion 120 can be easily made. However, as long as the identification portions 120 are provided in the vicinity of the fiber insertion portions 122 such that correspondence between the identification colors of the optical fibers 101 and the colors of the identification portion 120 can be easily made, the plurality of identification portions 120 may not be provided rearward of the plurality of fiber insertion portions 122. Furthermore, the identification portion 120 may not be provided.

The separator 121 is a part that partitions a space between the plurality of optical fibers 101 aligned. In other words, each of the separators 121 may be disposed in a space between a respective pair of the optical fibers 101. In the second embodiment, the separator 121 is provided as a wall extending in the front-rear direction. Note that, as illustrated in FIGS. 10 and 11, the separator 121 is not provided in a part where the groove 124 is formed. In the second embodiment, to separate the plurality of optical fibers 101 (in this case, 12 optical fibers) that are exposed from an optical fiber cord from each other, a plurality of the separators 121 (in this case, 11 separators) are provided. The plurality of separators 121 are arranged in the left-right direction, and the fiber insertion portions 122 are formed between the separators 121. However, at the end portions of the fiber aligner 116 in the left-right direction, the fiber insertion portion 122 is formed between the separator 121 and the main body portion housing 111A. The fiber insertion portion 122 is a part to which the optical fiber 101 is inserted. In the second embodiment, by inserting each of the plurality of optical fibers 101 into one of the plurality of fiber insertion portions 122 (in this case, 12 fiber insertion portions) formed as described above, the plurality of optical fibers 101 (in this case, 12 optical fibers) can be separated from each other. Note that, the number of the fiber insertion portions 122 (the separators 121) can be varied depending on the number of the optical fibers 101 exposed from the optical fiber cord. Furthermore, the optical fibers 101 may not be inserted to the fiber insertion portions 122 in one-to-one relationship. For example, two of the optical fibers 101 may be inserted into each of the fiber insertion portions 122, as in the optical fiber alignment tool 110 according to a second modification described below (see FIG. 18B).

In the second embodiment, the identification portions 120 provided in correspondence with identification colors of the optical fibers 101 and the fiber insertion portions 122 provided in correspondence with the identification portions 120 are configured to insert the plurality of optical fibers 101 into the respective fiber insertion portions 122 in predetermined order. A space between the fiber insertion portions 122 is partitioned by the separator 121. That is, when the plurality of optical fibers 101 are inserted into the fiber insertion portions 122, the space between the optical fibers 101 is partitioned by the separator 121. As a result, any one of the optical fibers 101 can be inhibited from being positionally replaced with another of the optical fibers 101 in the left-right direction, and thus the order of the plurality of optical fibers 101 aligned in predetermined order can be maintained. Further, as long as the order of the plurality of optical fibers 101 aligned in predetermined order can be maintained, the separator 121 may not be provided as a wall extending in the front-rear direction (the space between the optical fibers 101 may not be partitioned by a wall). For example, as in the optical fiber alignment tool 110 according to a first modification described below (see FIG. 18A), the plurality of optical fibers 101 may be adhered to an adhesive portion 147 to inhibit any one of the optical fibers 101 from being positionally replaced with another of the optical fibers 101 in the left-right direction.

Note that, as illustrated in FIGS. 10 and 11, in the second embodiment, a tapered portion 125 is formed on the rear side of the separator 121. Specifically, the tapered portion 125 is formed so as to have the width in the left-right direction decreasing from front to rear. As a result, the fiber insertion portion 122 is formed so as to widen toward the side (rear side) on which the optical fibers 101 are inserted. Thus, the optical fibers 101 can be easily inserted into the fiber insertion portions 122.

The groove 124 is a part in which the bridge 115 is accommodated. Note that as illustrated in FIGS. 10 and 11, the groove 124 is formed as a groove extending in the left-right direction in the top surface of the fiber aligner 116 (the surface in which the separators 121 are provided).

The pin 123 is a part that protrudes from the fiber aligner 116. In the second embodiment, a pair of the pins 123 (the pin 123A and the pin 123B) protruding rearward and forward are provided. The pin 123A is provided on the rear side of the fiber aligner 116, and the pin 123B is provided on the front side of the fiber aligner 116. However, in FIGS. 10 to 13B, the pin 123B is not illustrated. The pins 123 (the pin 123A and the pin 123B) are inserted into the rails 130 (30A and 30B) provided in the slider 118 described below. Furthermore, the pins 123 are provided so as to be movable with respect to the rails 130. The pins 123 can move along the rails 130, which allows movement of the entire fiber aligner 116 with respect to the slider 118. Conversely, the entire fiber aligner 116 moves by moving the slider 118.

Fiber Holding portion 117

The fiber holding portion 117 includes the slider 118 and the main body side lid 119.

The slider 118 is a part for switching the state of the optical fiber alignment tool 110 between the initial state and the gathering state. The slider 118 is provided so as to be movable in the left-right direction with respect to the main body portion housing 111A. The slider 118 includes the rails 130 (the rail 130A and the rail 130B), arms 131 (the arm 131A and the arm 131B), shoulders 132 (a shoulder 132A and a shoulder 132B), and a stopper 134.

The rail 130 is a part into which the pin 123 of the fiber aligner 116 is inserted. In the second embodiment, a pair of the rails 130 (the rail 130A and the rail 130B) are formed on the rear side and the front side. The rail 130A is formed on the rear side of the slider 118, and the rail 130B is formed on the rear side of the slider 118. However, in FIGS. 10 to 13B, the rail 130B is not illustrated. Note that the pin 123A is inserted into the rail 130A, and the pin 123B is inserted into the rail 130B (however, in FIGS. 10 to 13B, the rail 130B and the pin 123B are not illustrated). The rail 130A and the rail 130B support the pin 123A and the pin 123B, respectively, such that the pin 123A and the pin 123B can be moved.

As illustrated in FIGS. 12A and 12C, the rail 130A and the rail 130B each include an upper rail section 144, a slope section 145, and a lower rail section 146. In FIGS. 12A and 12C, however an upper rail section 144A, a slope section 145A, and a lower rail section 146A of the rail 130A are illustrated, an upper rail section 144B, a slope section 145B, and a lower rail section 146B of the rail 130B are not illustrated. The upper rail section 144, the slope section 145, and the lower rail section 146 collectively form an opening, and the pin 123 can freely move from the upper rail section 144 to the lower rail section 146 through the slope section 145.

The upper rail section 144 is a section of the rail 130 where the pin 123 is positioned when the fiber aligner 116 is in the initial position. The upper rail section 144 is located at a higher position than that of the lower rail section 146. As illustrated in FIG. 12A, when the pin 123 is positioned at the upper rail section 144, the fiber aligner 116 is in the initial position, and each of the plurality of optical fibers 101 can be inserted into a corresponding one of the plurality of fiber insertion portions 122. As illustrated in FIGS. 12A and 12B, after the plurality of optical fibers 101 are inserted into the plurality of fiber insertion portions 122, the optical fibers 101 are separated from each other by the separators 121, and the predetermined order of the plurality of optical fibers 101 is maintained.

The slope section 145 is a section of the rail 130 where the pin 123 is positioned while the fiber aligner 116 moves between the initial position and the gathering position. The slope section 145 is a section that connects the upper rail section 144 and the lower rail section 146. As described above, the upper rail section 144 is located at a higher position than that of the lower rail section 146. Thus, the slope section 145 is a section sloping from the upper rail section 144 to the lower rail section 146.

The lower rail section 146 is a part of the rail 130 where the pin 123 is located when the plurality of optical fibers 101 are gathered. The lower rail section 146 is located at lower position than that of the upper rail section 144. When the slider 118 is moved such that the pin 123 passes through the slope section 145 and reaches to the left end of the lower rail section 146, the separators 121 move downward with respect to the main body portion housing 111A, and the optical fibers 101 becomes unseparated. In other words, while the pin 123 is positioned in the lower rail section 146, the separators 121 are in a state of being retracted from between the optical fibers 101. Thus, the separators 121 may be retractable from a space between pair of the optical fibers 101. As illustrated in FIG. 12C, when the pin 123 is located on the right end of the lower rail section 146, the fiber aligner 116 is in the gathering position. Note that, while the pin 123 is positioned in the lower rail section 146, the plurality of optical fibers 101 are in a state of being sandwiched between the bridge 115 and the main body side lid 119, and thus the predetermined order of the plurality of optical fibers 101 is maintained.

The arm 131 is a part on which the plurality of optical fibers 101 are placed. In the second embodiment, the plurality of optical fibers 101 are placed on the arm 131 in both the initial position and the gathering position. Note that the arm 131 may also be referred to as the placement portion 31. As described below, even in the gathering state after the separators 121 have retracted to a lower position, the plurality of optical fibers 101 remain placed on the arm 131. As illustrated in FIGS. 10 and 11, in the second embodiment, two of the arms 131 (the arm 131A and the arm 131B) are provided. Each of the arms 131 (the arm 131A and the arm 131B) is formed in the upper part of the slider 118 and extends to the left. The optical fibers 101 are placed on a top surface (hereinafter, also referred to as a "mount surface") of each of the arm 131A and the arm 131B. Note that the mount surface is a surface parallel to the left-right direction and the front-rear direction (in other words, a surface perpendicular to the up-down direction).

The shoulder 132 is a part that sandwiches and holds the plurality of optical fibers 101 with using the main body portion housing 111A. The shoulder 132 is a part that protrudes upward at the right end of the arm 131. In the second embodiment, two of the shoulders 132 (the shoulder 132A and the shoulder 132B) are provided. The shoulder 132A protrudes from the arm 131A, and the shoulder 132B protrudes from the arm 131B. As illustrated in FIG. 11, in the second embodiment, the shoulder 132 sandwich and hold the plurality of optical fibers 101 with using the main body portion housing 111A in the gathering state (i.e., assemble and hold the plurality of optical fibers 101).

In the following description, operation of the fiber aligner 116 and the fiber holding portion 117 when the slider 118 is moved from the initial position to the gathering position, will be described. FIGS. 12A and 12B illustrate the optical fiber alignment tool 110 in the initial state, in which the plurality of optical fibers 101 are inserted into the fiber insertion portions 122 (the fiber aligner 116). FIG. 12A is a side view of the optical fiber alignment tool 110 as viewed from rear to front. FIG. 12B illustrates a cross-sectional view of the optical fiber alignment tool 110 when the optical fiber alignment tool 110 is cut along a plane perpendicular to the left-right direction.

As illustrated in FIG. 12A, the slider 118 in the initial state is positioned on the right side. In this state, the pin 123 is positioned on the left end of the upper rail section 144. In this state, the separators 121 can separate the plurality of optical fibers 101 to make the plurality of optical fibers 101 apart from each other. In other words, the operator can individually insert the plurality of optical fibers 101 into the respective fiber insertion portions 122. In other words, the operator can randomly insert the plurality of optical fibers 101 into the respective fiber insertion portions 122.

As the operator slides, to the left, the slider 118 from the initial state illustrated in FIGS. 12A and 12B, the pin 123 moves from the upper rail section 144 to the slope section 145. As described above, the slope section 145 is a section that connects the upper rail section 144 and the lower rail section 146 and slopes from the upper rail section 144 to the lower rail section 146. Thus, as the slider 118 is slid, the pin 123 travels through the slope section 145. Thus, as the pin 123 travels through the slope section 145, the pin 123 (the fiber aligner 116) moves downward with respect to the slider 118. In other words, as the pin 123 travels through the slope section 145, the separators 121 move downward.

FIGS. 12C and 12D illustrate the optical fiber alignment tool 110 in the gathering state. FIG. 12C is a side view of the optical fiber alignment tool 110 as viewed from rear to front. FIG. 12D illustrates a cross-sectional view of the optical fiber alignment tool 110 when the optical fiber alignment tool 110 is cut along a plane perpendicular to the left-right direction.

As the operator further slides, to the left, the slider 118 from the above-described state, the pin 123 moves from the slope section 145 to the lower rail section 146. As a result, the separators 121 are retracted from between the optical fibers 101, and in this state, the separators 121 no longer separate the plurality of optical fibers 101. In other words, the plurality of optical fibers 101 can be moved in the left-right direction. However, as described above, the plurality of optical fibers 101 are sandwiched and held between the main body side lid 119 and the bridge 115 in the up-down direction, and thus the predetermined order of the plurality of optical fibers 101 remains maintained.

As illustrated in FIG. 12D, the slider 118 in the gathering state is positioned on the left side. In this state, the pin 123 is located on the right end of the lower rail section 146. As a result, the plurality of optical fibers 101 are in a state of being sandwiched and held by the shoulder 132 and the housing 11. In other words, the plurality of optical fibers 101 are sandwiched and held (in other words, the plurality of optical fibers 101 are assembled and held) in the direction in which the plurality of optical fibers 101 are arranged (the left-right direction), and the predetermined order of the plurality of optical fibers 101 remains maintained.

The stopper 134 is a part that restricts the slider 118 from being returned from the gathering state to the initial state, while the main body side lid 119 is closed. As illustrated in FIGS. 10, 11, 12A and 12C, the stopper 134 projects in a diagonally upward right direction with respect to the bottom surface of the slider 118. The stopper 134 includes an engagement portion 136 and an elastic deformation portion 137.

The engagement portion 136 is a part that engages with a protrusion 135 of the main body side lid 119. The engagement portion 136 is provided on the protruding side end of the stopper 134. The engagement portion 136 is formed as a protruding part that protrudes upward, and engages with the protrusion 135 of the main body side lid 119 that protrudes downward when the main body side lid 119 is closed (see FIG. 14A described below).

The elastic deformation portion 137 is a part that enables the engagement portion 136 to be pressed down by elastically deforming. The elastic deformation portion 137 forms a root side part of the stopper 134.

The main body side lid 119 is a part that sandwiches the plurality of optical fibers 101 in the up-down direction, together with the bridge 115 of the main body portion housing 111A. As illustrated in FIGS. 12B and 12D, the plurality of optical fibers 101 are sandwiched and held between the main body side lid 119, and the bridge 115 provided in the main body portion housing 111A and the arms 131 of the slider 118 in both the initial position and the gathering position. As a result, the plurality of optical fibers 101 are kept sandwiched and held from the initial state to the gathering state, and thus the predetermined order of the plurality of optical fibers 101 is maintained. However, after the separators 121 are retracted downward (from between the optical fibers 101), the plurality of optical fibers 101 can be moved in the left-right direction, while maintaining the predetermined order.

The main body side lid 119 includes the protrusion 135. The protrusion 135 is a part with which the engagement portion 136 of the stopper 134 engages when the slider 118 is moved from the gathering state to the initial state while the main body side lid 119 is closed. The protrusion 135 is provided on a hinge side of the main body side lid 119. As illustrated in FIGS. 12A and 12C, when the main body side lid 119 is closed, the protrusion 135 protrudes downward, and engages with the engagement portion 136 of the stopper 134 formed as a protruding part protruding upward (see FIG. 14A described below).

FIG. 14A is an explanatory diagram illustrating a state in which the main body side lid 119 is closed in the main body portion 111 in the gathering state. In the gathering state illustrated in FIG. 14A, as described above, the separators 121 have been retracted from between the optical fibers 101. Note that the upper side of the plurality of optical fibers 101 in the gathering state is in a sandwiched state by the main body side lid 119. In this state, if an operator attempts to move the slider 118 to the right (to the initial position), the engagement portion 136 provided on the stopper 134 engages with the protrusion 135 provided on the main body side lid 119. As a result, the slider 118 is restricted from returning from the gathering state (the state of being positioned on the left side) to the initial state (the state of being positioned on the right side). If there is no stopper 134 and the operator attempts to move the slider 118 to the right (to the initial position), then the separators 121 are moved upward and the optical fibers 101 may be pinched between the separators 121 and the main body side lid 119. In other words, there is a possibility that the optical fibers 101 may be damaged by being pinched between the separators 121 and the main body side lid 119. The optical fiber alignment tool 110 according to the second embodiment, which includes the stopper 134, can inhibit the optical fiber 101 from being damaged by being pinched between the separators 121 and the main body side lid 119, when the slider 118 in the gathering state is unintentionally moved to the initial position.

FIG. 14B is an explanatory diagram illustrating a state in which the main body side lid 119 is opened in the main body portion 111 in the gathering state. As illustrated in FIG. 14B, when the main body side lid 119 is opened, the protrusion 135 provided on the hinge side of the main body side lid 119 is moved upward. As a result, when the operator moves the slider 118 to the right (to the initial position), the engagement portion 136 can be moved below the protrusion 135 without coming into contact with the protrusion 135. In other words, the slider 118 can be moved to the right (to the initial position) without the stopper 134 engaging to the engagement portion 136. Even if the optical fiber 101 remains placed on the mount surface, the optical fiber 101 is prevented from being pinched between the separators 121 and the main body side lid 119, because the main body side lid 119 is opened.

In FIGS. 14A and 14B described above, a case has been described that the slider 118 is moved from the left (the gathering position) to the right (the initial position). Incidentally, in the second embodiment, when the slider 118 is moved from the right (the initial position) to the left (the gathering position), the main body side lid 119 is also in a closed state. In other words, in this case as well, the engagement portion 136 provided on the stopper 134 comes into contact with the protrusion 135 provided on the main body side lid 119.

In the second embodiment, an inclined surface 136A is provided in the engagement portion 136. The inclined surface 136A is a left surface of the engagement portion 136. In other words, the inclined surface 136A is a surface that comes into contact with the protrusion 135 when the slider 118 is moved from the right (the initial position) to the left (the gathering position). The inclined surface 136A is formed so as to face in a diagonally upward left direction. FIG. 12C described above illustrates the stopper 134 when the protrusion 135 comes in contact with the inclined surface 136A, using a dashed line. In the second embodiment, when the protrusion 135 comes into contact with the inclined surface 136A, the engagement portion 136 is received a downward direction force from the protrusion 135, so that the elastic deformation portion 137 is elastically deformed, and as a result, the engagement portion 136 is pressed downward. As a result, the engagement portion 136 can be moved under the protrusion 135. In other words, when the slider 118 is moved from the right (the initial position) to the left (the gathering position), the engagement portion 136 does not engage with the protrusion 135, and thus the slider 118 is not restricted from transitioning from the initial state to the gathering state.

<Method of Setting Plurality of Optical Fibers 101 in Fiber Holder 106 (Set Procedure)>

Figure 16A:
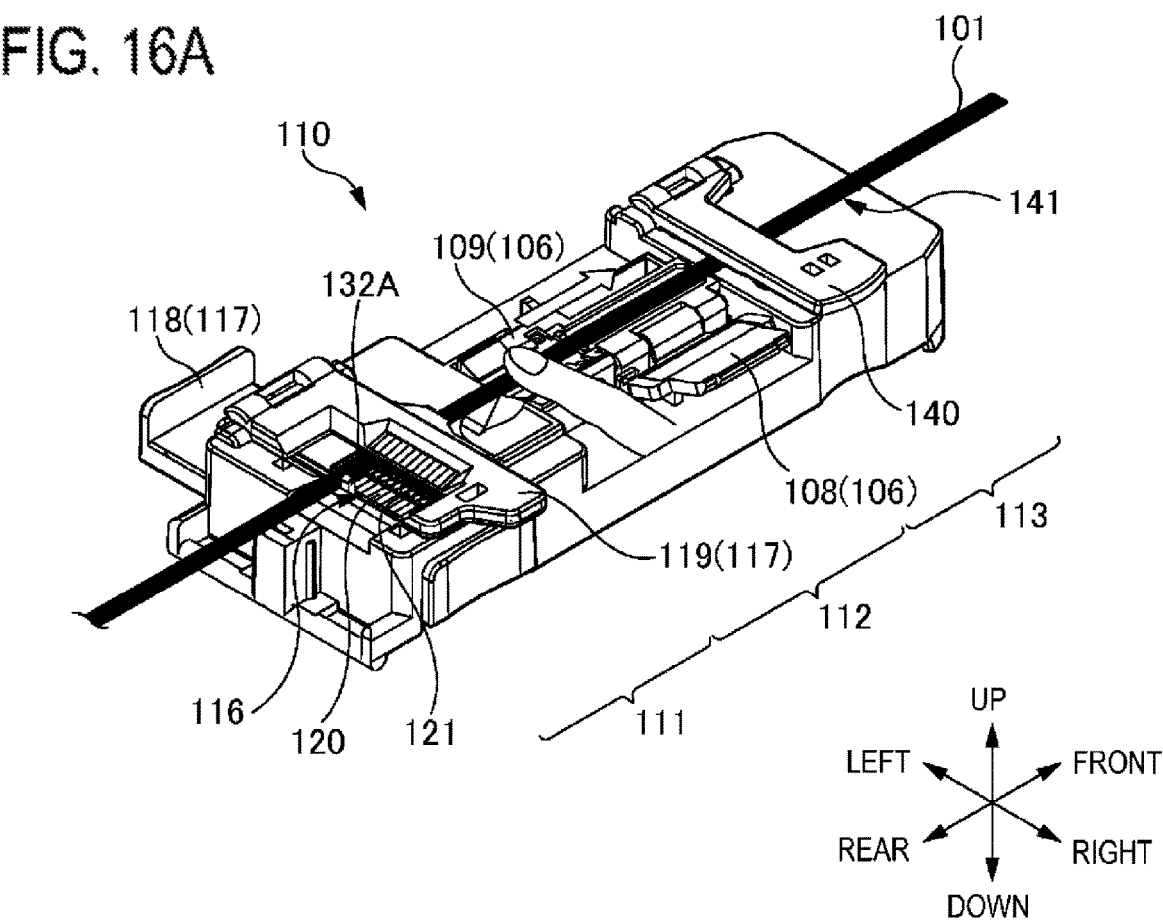
FIG. 16A is a perspective view illustrating when the plurality of optical fibers 101 are accommodated in V-grooves 107 of a fiber holder 106.
Figure 16B:
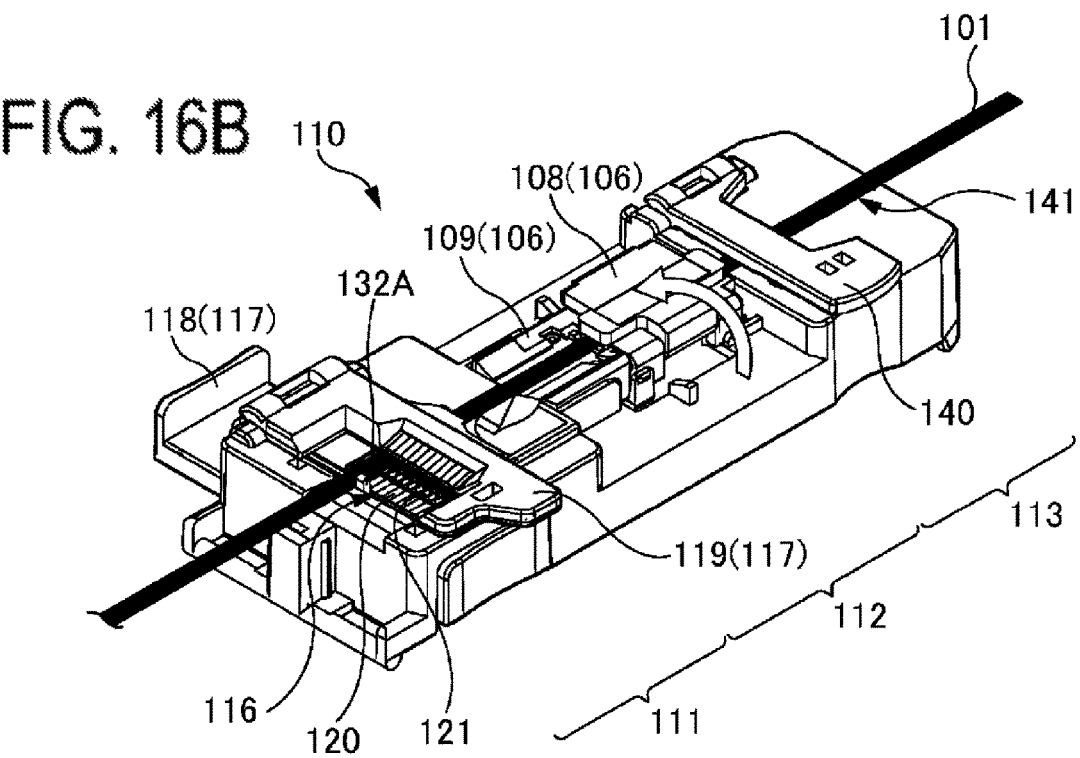
FIG. 16B is a perspective view illustrating when a lid 108 of the fiber holder 106 is closed.

FIG. 15A is a perspective view illustrating a state in which the optical fibers 101 are inserted into the fiber insertion portions 122. FIG. 15B is a perspective view illustrating a state in which the plurality of optical fibers 101 are gathered. FIG. 16A is a perspective view illustrating when the plurality of optical fibers 101 are accommodated in the V-grooves 107 of the fiber holder 106. FIG. 16B is a perspective view illustrating when a lid 108 of the fiber holder 106 is closed. Note that the shape of the V-groove 107 of the fiber holder 106 described in relation to FIG. 16A will be described with reference to in FIG. 9.

First, as illustrated in FIG. 15A, the operator places the plurality of optical fibers 101 in the respective fiber insertion portions 122. Before the operator places the plurality of optical fibers 101 in the respective fiber insertion portions 122, the operator checks that the optical fiber alignment tool 110 is in the initial state. In other words, the operator checks that the slider 118 is positioned on the right side, as illustrated in FIG. 15A. In the initial state, the plurality of optical fibers 101 can be separated from each other by the separators 121, and in this state, the operator can randomly insert the plurality of optical fibers 101 into the respective fiber insertion portions 122. As illustrated in FIG. 15A, the plurality of optical fibers 101 (in this case, seven optical fibers) are randomly inserted into the fiber insertion portions 122.

FIG. 15A is a perspective view illustrating a state in which the plurality of optical fibers 101 are inserted into the fiber insertion portions 122. As described above, in the second embodiment, the plurality of fiber insertion portions 122 (in this case, 12 fiber insertion portions) are provided. The space between the fiber insertion portions 122 is partitioned by the separator 121. Thus, the operator can randomly insert the plurality of optical fibers 101 into the respective fiber insertion portions 122. In other words, it is not necessary to insert the optical fibers 101 in order starting with the rightmost of the plurality of fiber insertion portions 122. As illustrated in FIG. 15A, the optical fiber 101 can be inserted into any of the fiber insertion portions 122. Upon insertion, as described above, each of the optical fibers 101 is inserted into a predetermined one of the fiber insertion portions 122 such that correspondence between the identification color of the optical fiber 101 and the color of the identification portion 120 is made. As a result, the plurality of optical fibers 101 can be easily aligned in predetermined order.

Then, as illustrated in FIG. 15B, the operator slides the slider 118. The operator slides the slider 118 located on the right side in the initial state, to the left. Thus, the pin 123 is moved from the upper rail section 144 to the slope section 145. As a result, as the pin 123 travels through the slope section 145, the pin 123 (the fiber aligner 116) moves downward with respect to the slider 118. In other words, as the pin 123 travels through the slope section 145, the separators 121 are retracted downward. As the operator further slides the slider 118 to the left, the pin 123 is moved from the slope section 145 to the lower rail section 146. As a result, the separators 121 are positioned below the mount surface of the arm 131 on which the optical fibers 101 are placed. In other words, the plurality of optical fibers 101 can be moved in the left-right direction while maintaining the predetermined order (in other words, the plurality of optical fibers 101 can be gathered). When the slider 118 is slid to the gathering position, the plurality of optical fibers 101 are held in a sandwiched state in the direction in which the plurality of optical fibers 101 are arranged, while maintaining the predetermined order of the plurality of optical fibers 101. Note that on the mount surface of the arm 131, the optical fibers 101 can be moved in the left-right direction with the optical fibers 101 placed thereon.

Then, as illustrated in FIG. 16A, the operator places the plurality of optical fibers 101 in the respective V-grooves 107 of the fiber holder 106 (see FIG. 9 for the V-groove 107).

In FIG. 15B described above, the plurality of optical fibers 101 in a gathered state are illustrated. In the gathering state, the plurality of optical fibers 101 are held in a state of being arranged at a predetermined pitch. Thus, as illustrated in FIG. 16A, the operator can press the plurality of optical fibers 101 from above the fiber holder 106 in a manner like stroking in the front-rear direction, thereby easily placing the plurality of optical fibers 101 in the respective grooves of the fiber holder 106.

Next, as illustrated in FIG. 16B, the operator closes a cover of the fiber holder 106 to hold the plurality of optical fibers 101. As a result, the fiber holder 106 holds the plurality of optical fibers 101 in predetermined order and at a predetermined pitch. Finally, the operator removes the fiber holder 106 holding the plurality of optical fibers 101 from a holder holding portion.

Second Comparative Example

Figure 17A:
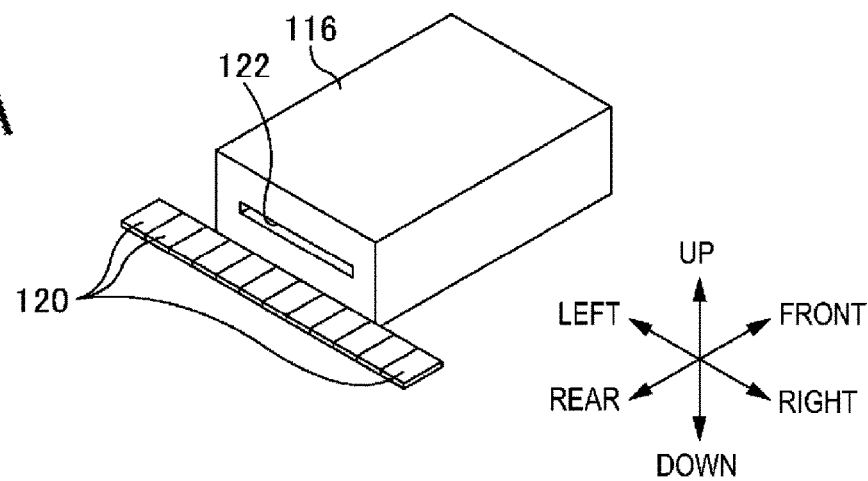
FIGS. 17A to 17C are explanatory diagrams illustrating a state in which the plurality of optical fibers 101 are inserted into a fiber insertion portion 122 of an optical fiber alignment tool 110 of a second comparative example.
Figure 17B:
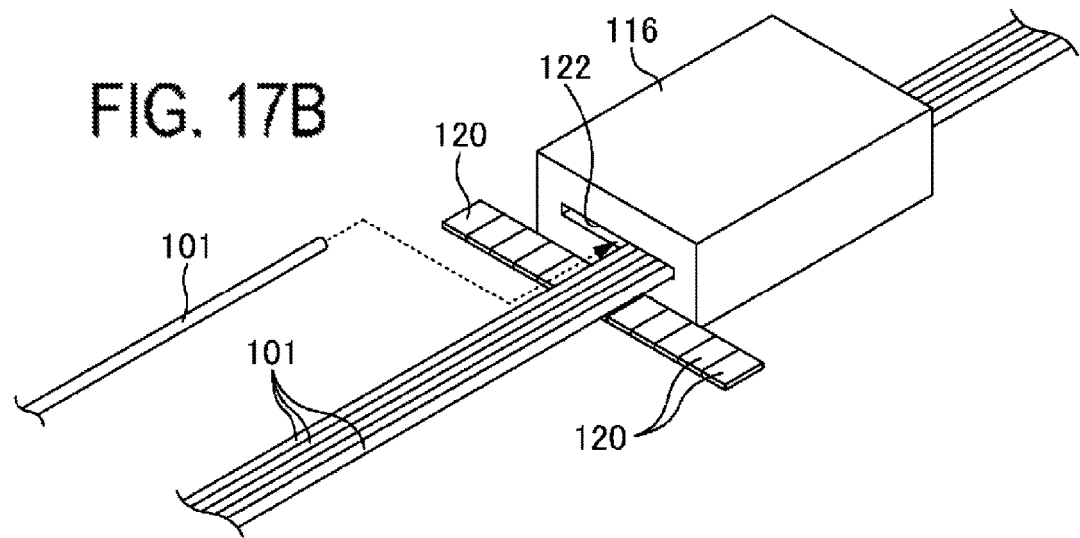
Figure 17C:
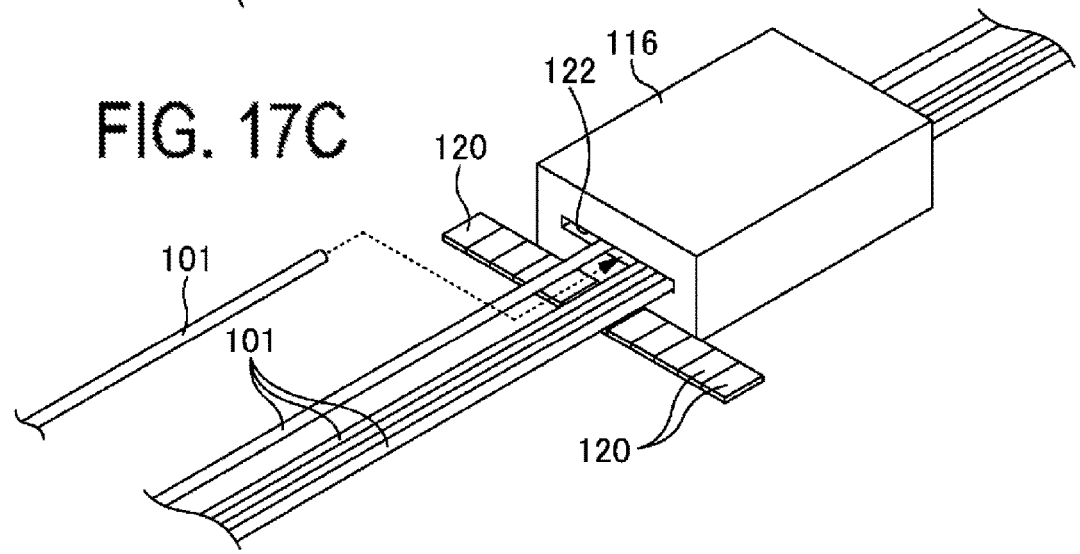

FIGS. 17A to 17C are explanatory diagrams illustrating a state in which the plurality of optical fibers 101 are inserted into a fiber insertion portion 122 of an optical fiber alignment tool 110 of a second comparative example. Note that in FIGS. 17A to 17C, only the fiber aligner 116 is illustrated for ease of explanation.

As illustrated in FIG. 17A, in the optical fiber alignment tool 110 of the second comparative example, the separator 121 is not provided in the fiber aligner 116. Thus, as illustrated in FIG. 17B, in the optical fiber alignment tool 110 of the second comparative example, all of the plurality of optical fibers 101 are inserted into the single fiber insertion portion 122 provided in the fiber aligner 116.

By the way, the optical fiber alignment tool 110 of the second comparative example is also configured to align the plurality of optical fibers 101 in predetermined order. The width of the fiber insertion portion 122 in the up-down direction is approximately the same as the outer diameter of the optical fiber 101. As illustrated in FIG. 17B, the optical fibers 101 are inserted so as to be tightly arranged on the right side. As a result, once all of the plurality of optical fibers 101 are inserted, the optical fibers 101 can be in a state of being aligned in predetermined order.

However, each of the inserted optical fibers 101 tightly arranged on the right side can move in the left-right direction. As a result, as illustrated in FIG. 17C, the optical fiber 101 to be in a tightly arranged state on the right side may move to the left side, and thus a space may be generated between the optical fibers 101. If the optical fiber 101 to be inserted is mistakenly inserted into the space, the optical fibers 101 are aligned in a wrong order. In particular, this occurs frequently in the field installable optical connectors for manually aligning a plurality of optical fibers in predetermined order.

However, in the optical fiber alignment tool 110 according to the second embodiment, the space between the fiber insertion portions 122 is partitioned by the separator 121. That is, when the plurality of optical fibers 101 are inserted into the fiber insertion portions 122, the space between the optical fibers 101 is partitioned by the separator 121. This can prevent a space between the optical fibers 101 from being generated and the optical fiber 101 to be inserted from being mistakenly inserted into the space, and thus, the optical fibers 101 can be inhibited from being aligned in a wrong order. This can increase workability in aligning and holding the plurality of optical fibers 101 in predetermined order and at a predetermined pitch.

MODIFICATION

First Modification

Figure 18A:
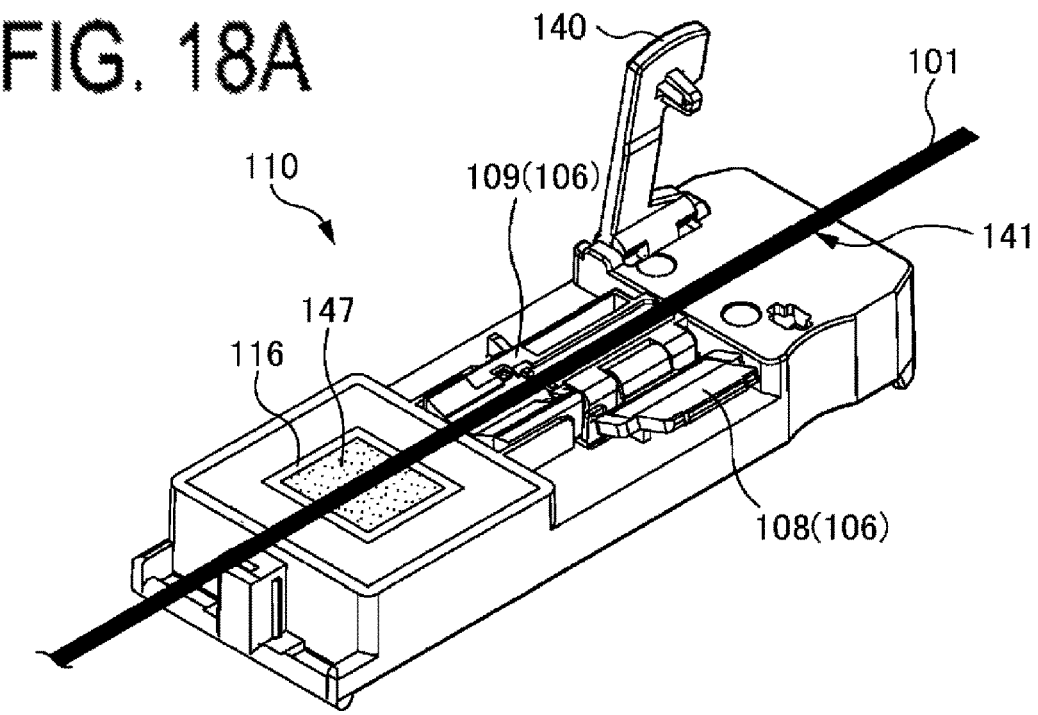
FIG. 18A is a perspective view of the optical fiber alignment tool 110 according to a first modification. FIG.

FIG. 18A is a perspective view of the optical fiber alignment tool 110 according to a first modification. In the optical fiber alignment tool 110 according to the first modification, the fiber aligner 116 includes the adhesive portion 147 as the separator 121. The adhesive portion 147 is a part that separates the plurality of optical fibers 101 from each other in an aligned state by adhesively attaching the plurality of optical fibers 101 to the adhesive portion 147. Note that, also in the optical fiber alignment tool 110 according to the first modification, the fiber aligner 116 can be moved in the up-down direction with respect to the main body portion housing 111A, and the adhesive portion 147 is in a state of being retracted from between the optical fibers 101 while the pin 123 is positioned in the lower rail section 146.

Second Modification

Figure 18B:
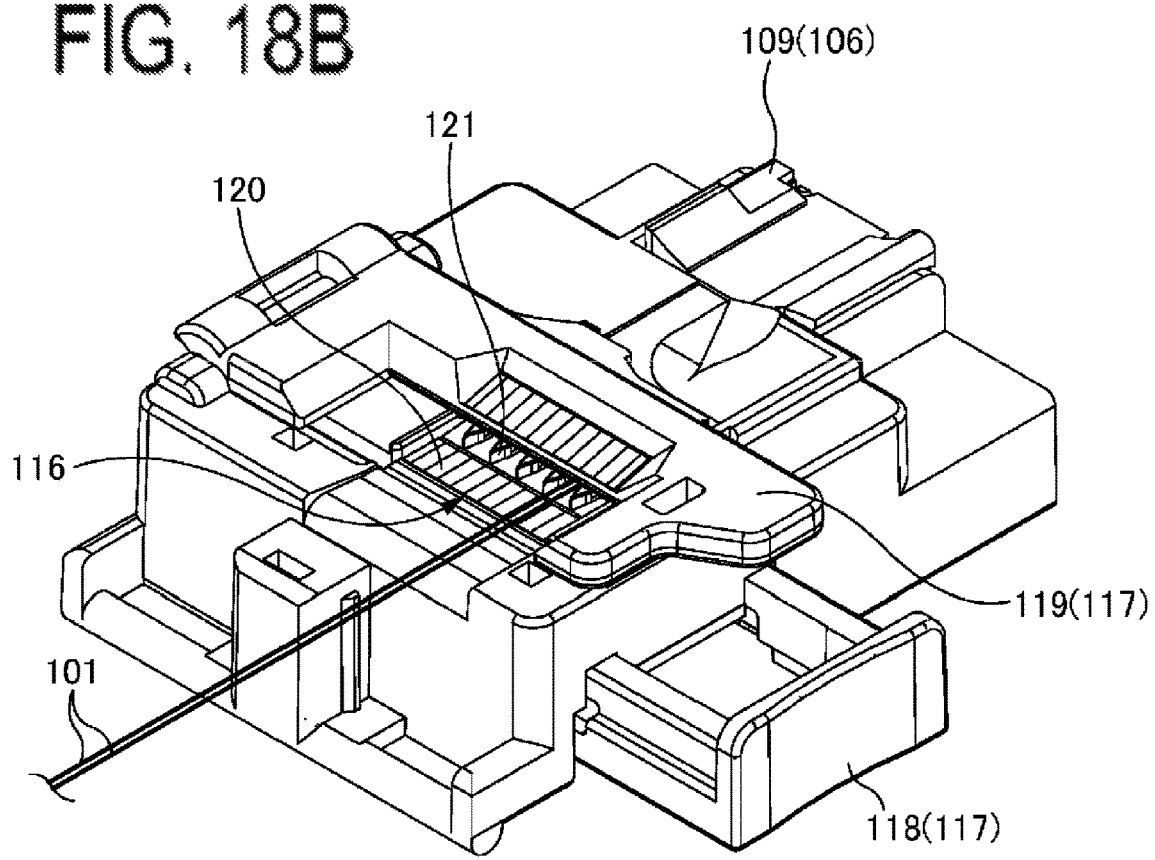

FIG. 18B is a perspective view of the main body portion 111 of the optical fiber alignment tool 110 according to a second modification. In the optical fiber alignment tool 110 according to the second modification, two of the optical fibers 101 are inserted into each one of the fiber insertion portions 122. In the case where two of the optical fibers 101 are inserted into each one of the fiber insertion portions 122, another optical fiber 101 is prevented from being erroneously inserted between the optical fibers 101, as described in the second comparative example. In other words, it is possible to reduce the possibility in that the plurality of optical fibers 101 are aligned in the wrong order.

ADDITIONAL DESCRIPTION

The optical fiber alignment tool 110 may not include the stopper 134.

The foregoing embodiments are for ease of understanding of the present invention and are not intended to limit the present invention. Of course, the present invention may be changed and modified without departing from the spirit thereof, and the present invention includes equivalents thereof.

REFERENCE SIGNS LIST

1 Optical fiber, 6 Fiber holder, 10 Optical fiber alignment tool,
11 Housing, 12 Main body portion, 13 Holder holding portion,
14 Front holding portion, 15 Bridge, 16 Fiber aligner,
17 Fiber holding portion, 18 Slider, 19 Main body side lid,
20 Identification portion, 21 Separator, 22 Fiber insertion portion,
23A, 23B Pin, 24 Groove, 30A, 30B Rail,
31A, 31B Arm, 32A, 32B Shoulder, 33 Protrusion,
40 Front lid, 41 Front groove, 42 Lens,
43 Accommodating portion, 44A, 44B Upper rail section,
45A, 45B Slope section, 46A, 46B Lower rail section
101 Optical fiber 106 Fiber holder, 107 V-groove, 108 Lid,
109 Holder main body, 110 Optical fiber alignment tool, 111 Main body portion,
111A Main body portion housing, 112 Holder mount portion, 113 Front holding portion,
114 Fiber clamp, 115 Bridge, 116 Fiber aligner,
117 Fiber holding portion, 118 Slider, 119 Main body side lid,
120 Identification portion, 121 Separator, 122 Fiber insertion portion,
123A, 123B Pin, 124 Groove, 125 Tapered portion,
130A, 130B Rail, 131A, 131B Arm,
132A, 132B Shoulder, 134 Stopper, 135 Protrusion,
136 Engagement portion, 136A Inclined surface, 137 Elastic deformation portion,
140 Front cover, 141 Front groove, 142 Clamp cover,
144A, 144B Upper rail section, 145A, 145B Slope section,
146A, 146B Lower rail section, 147 Adhesive portion

The invention claimed is:

1. An optical fiber alignment tool, comprising:
a fiber aligner that includes:
separators that assort optical fibers; and
fiber insertion portions each disposed between a respective pair of the separators and that align the optical fibers in an alignment direction in a predetermined order when the optical fibers are inserted into the fiber insertion portions, wherein the alignment direction is perpendicular to an optical axis of the optical fibers; and
a fiber holding portion that includes a mount surface on which the optical fibers are mounted,
wherein the fiber holding portion is slidable with respect to the fiber aligner, and
wherein when the fiber holding portion is moved from a first position to a second position along the alignment direction, the fiber holding portion causes the fiber aligner to move, relative to the fiber holding portion, in a direction perpendicular to both the optical axis of the optical fibers and the alignment direction.

2. The optical fiber alignment tool according to claim 1, wherein the fiber holding portion holds the optical fibers in a sandwiched state in the alignment direction of the optical fibers, while maintaining the predetermined order.

3. The optical fiber alignment tool according to claim 1, wherein a tapered portion is formed in the fiber insertion portions on a side on which the optical fibers are inserted.

4. The optical fiber alignment tool according to claim 1, wherein one of the optical fibers is inserted into each of the fiber insertion portions.

5. The optical fiber alignment tool according to claim 2, wherein the fiber holding portion sandwiches the optical fibers in the direction perpendicular to the optical axis of the optical fibers and the alignment direction of the optical fibers, in a case where the fiber holding portion sandwiches and holds the optical fibers in the alignment direction of the optical fibers.

6. The optical fiber alignment tool according to claim 2, wherein the optical fibers are movable in the alignment direction of the optical fibers, in a case where the fiber holding portion sandwiches and holds the optical fibers in the alignment direction of the optical fibers.

7. The optical fiber alignment tool according to claim 6, wherein the separators do not protrude with respect to the mount surface.

8. The optical fiber alignment tool according to claim 1, further comprising:
   a holder holding portion that comprises a fiber holder,
   wherein the fiber holder holds the optical fibers in the predetermined order.

9. The optical fiber alignment tool according to claim 8, further comprising:
   a front holding portion that holds the optical fibers,
   wherein the holder holding portion is disposed between the fiber aligner and the front holding portion, in a direction of the optical axis of the optical fibers perpendicular to the alignment direction.

\* \* \* \* \*